US012759534B2

(12) United States Patent
Kaneko et al.

(10) Patent No.: US 12,759,534 B2
(45) Date of Patent: Oct. 13, 2026

(54) VEHICLE CONTROL APPARATUS, VEHICLE CONTROL METHOD, AND VEHICLE CONTROL SYSTEM

(71) Applicant: Hitachi Astemo, Ltd., Hitachinaka (JP)

(72) Inventors: Satoshi Kaneko, Hitachinaka (JP); Keisuke Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 279 days.

(21) Appl. No.: 18/690,541

(22) PCT Filed: Aug. 10, 2022

(86) PCT No.: PCT/JP2022/030553
§ 371 (c)(1),
(2) Date: Nov. 5, 2024

(87) PCT Pub. No.: WO2023/084857
PCT Pub. Date: May 19, 2023

(65) Prior Publication Data

US 2025/0196844 A1 Jun. 19, 2025

(30) Foreign Application Priority Data

Nov. 12, 2021 (JP) ................................ 2021-184650

(51) Int. Cl.
*B60W 30/02* (2012.01)
*B60W 10/04* (2006.01)
(Continued)

(52) U.S. Cl.
CPC .......... *B60W 30/025* (2013.01); *B60W 10/04* (2013.01); *B60W 10/18* (2013.01);
(Continued)

(58) Field of Classification Search
CPC ... B60W 30/025; B60W 50/0097; G08G 1/16
See application file for complete search history.

(56) References Cited

U.S. PATENT DOCUMENTS 8,190,330 B2 * 5/2012 Lee .......................... B62D 1/28 701/44
2015/0329108 A1 * 11/2015 Kodaira ................ B60W 30/02 701/41

(Continued)

FOREIGN PATENT DOCUMENTS

JP 6-92159 A 4/1994
JP 9-286313 A 11/1997

(Continued)

OTHER PUBLICATIONS

International Search Report (PCT/ISA/210) issued in PCT Application No. PCT/JP2022/030553 dated Oct. 25, 2022 with English translation (6 pages).

(Continued)

*Primary Examiner* — Long T Tran
(74) *Attorney, Agent, or Firm* — Crowell & Moring LLP

(57) ABSTRACT

In one aspect, a vehicle control apparatus, a vehicle control method, and a vehicle control system according to the present invention acquire control conditions including at least one of information about a running environment and information about a motion state of a vehicle in a preview area ahead on a running path on which the vehicle is running, start outputting control commands for generating a vehicle behavior based on the control conditions before the vehicle reaches the preview area, and stop outputting the control commands when the vehicle enters the preview area. In this way, an occupant in the vehicle can easily assume a posture in preparation for change in running environment or motion state of the vehicle.

5 Claims, 18 Drawing Sheets

(51) Int. Cl.

| | |
|---|---|
| ***B60W 10/18*** | (2012.01) |
| ***B60W 40/109*** | (2012.01) |
| ***B60W 50/00*** | (2006.01) |

(52) U.S. Cl.

CPC ...... *B60W 40/109* (2013.01); *B60W 50/0097* (2013.01); *B60W 50/0098* (2013.01); *B60W 2540/18* (2013.01); *B60W 2720/16* (2013.01); *B60W 2720/18* (2013.01)

(56) References Cited

U.S. PATENT DOCUMENTS

| | | | | |
|---|---|---|---|---|
| 2017/0253241 | A1* | 9/2017 | Filev | B60W 10/04 |
| 2017/0351262 | A1* | 12/2017 | Suzuki | B60K 31/00 |
| 2019/0129437 | A1* | 5/2019 | Liu | B60W 30/18154 |
| 2019/0361449 | A1* | 11/2019 | Ueno | B60W 50/0098 |
| 2020/0391764 | A1* | 12/2020 | Gotou | B60W 30/162 |
| 2021/0016793 | A1* | 1/2021 | Yamaguchi | G08G 1/165 |
| 2022/0126823 | A1* | 4/2022 | Lu | B60W 60/001 |
| 2022/0144274 | A1* | 5/2022 | Kudo | B60W 30/18159 |
| 2022/0281456 | A1* | 9/2022 | Giovanardi | G08G 1/0112 |
| 2022/0324421 | A1* | 10/2022 | Giovanardi | G08G 1/0145 |
| 2023/0347861 | A1* | 11/2023 | Sugawara | B60W 10/20 |

FOREIGN PATENT DOCUMENTS

| | | | |
|---|---|---|---|
| JP | 2012-196997 | A | 10/2012 |
| JP | 2016-7979 | A | 1/2016 |
| JP | 2016-178776 | A | 10/2016 |
| JP | 2019-182104 | A | 10/2019 |
| JP | 2020-131882 | A | 8/2020 |

OTHER PUBLICATIONS

Japanese-language Written Opinion (PCT/ISA/237) issued in PCT Application No. PCT/JP2022/030553 dated Oct. 25, 2022 with English translation (6 pages).

International Preliminary Report on Patentability (PCT/IB/326, PCT/IB/338, and PCT/IB/373) issued in PCT Application No. PCT/JP2022/030553 dated May 23, 2024, including Japanese-language Written Opinion (PCT/ISA/237) with English translation (9 pages).

* cited by examiner

VEHICLE CONTROL APPARATUS, VEHICLE CONTROL METHOD, AND VEHICLE CONTROL SYSTEM

TECHNICAL FIELD

The present invention relates to a vehicle control apparatus, to a vehicle control method, and to a vehicle control system.

BACKGROUND ART

Patent Document 1 discloses a motion sickness suppression device including a vehicle information acquisition unit that acquires vehicle information about a vehicle, a map information acquisition unit that acquires map information about where the vehicle is running, a head position detection unit that detects the head position of an occupant in the vehicle, and a guiding unit that guides the head of the occupant to a position suppressing motion sickness based on the vehicle information acquired by the vehicle information acquisition unit, the map information acquired by the map information acquisition unit, and the head position detected by the head position detection unit.

REFERENCE DOCUMENT LIST

Patent Document

Patent Document 1: JP 2020-131882 A

SUMMARY OF THE INVENTION

Problem to be Solved by the Invention

If an occupant in a vehicle can anticipate acceleration, etc., to which the occupant will be subjected based on vehicle behavior, or can assume a posture in preparation for the acceleration, etc., unintended disturbance in the posture of the occupant or the like can be reduced, and the occupant will have less discomfort.

However, if the occupant's posture is guided by display, vibration, sound, smell, or the like, the occupant needs to understand the meaning of the display or the like, and needs to take action based on this understanding.

Therefore, with the above-described guiding method, it is difficult for the occupant to intuitively respond to change in running environment or motion state such as a turn or deceleration of the vehicle, and the occupant may find this guiding method inconvenient.

The present invention has been made in view of actual circumstances, and it is an object of the present invention to provide a vehicle control apparatus, a vehicle control method, and a vehicle control system that enable an occupant in a vehicle to easily assume a posture in preparation for change in running environment or motion state of the vehicle.

Means for Solving the Problem

In one aspect, according to the present invention, control conditions including at least one of information about a running environment and information about a motion state of a vehicle in a preview area ahead on a running path on which the vehicle is running is acquired, outputting control commands for generating a vehicle behavior based on the control conditions is started before the vehicle reaches the preview area, and outputting the control commands is stopped when the vehicle enters the preview area.

Effects of the Invention

According to the present invention, an occupant in a vehicle can easily assume a posture in preparation for change in running environment or motion state of the vehicle.

MODE FOR CARRYING OUT THE INVENTION

Hereinafter, examples of a vehicle control apparatus, a vehicle control method, and a vehicle control system according to the present invention will be described with reference to the drawings.

Figure 1:
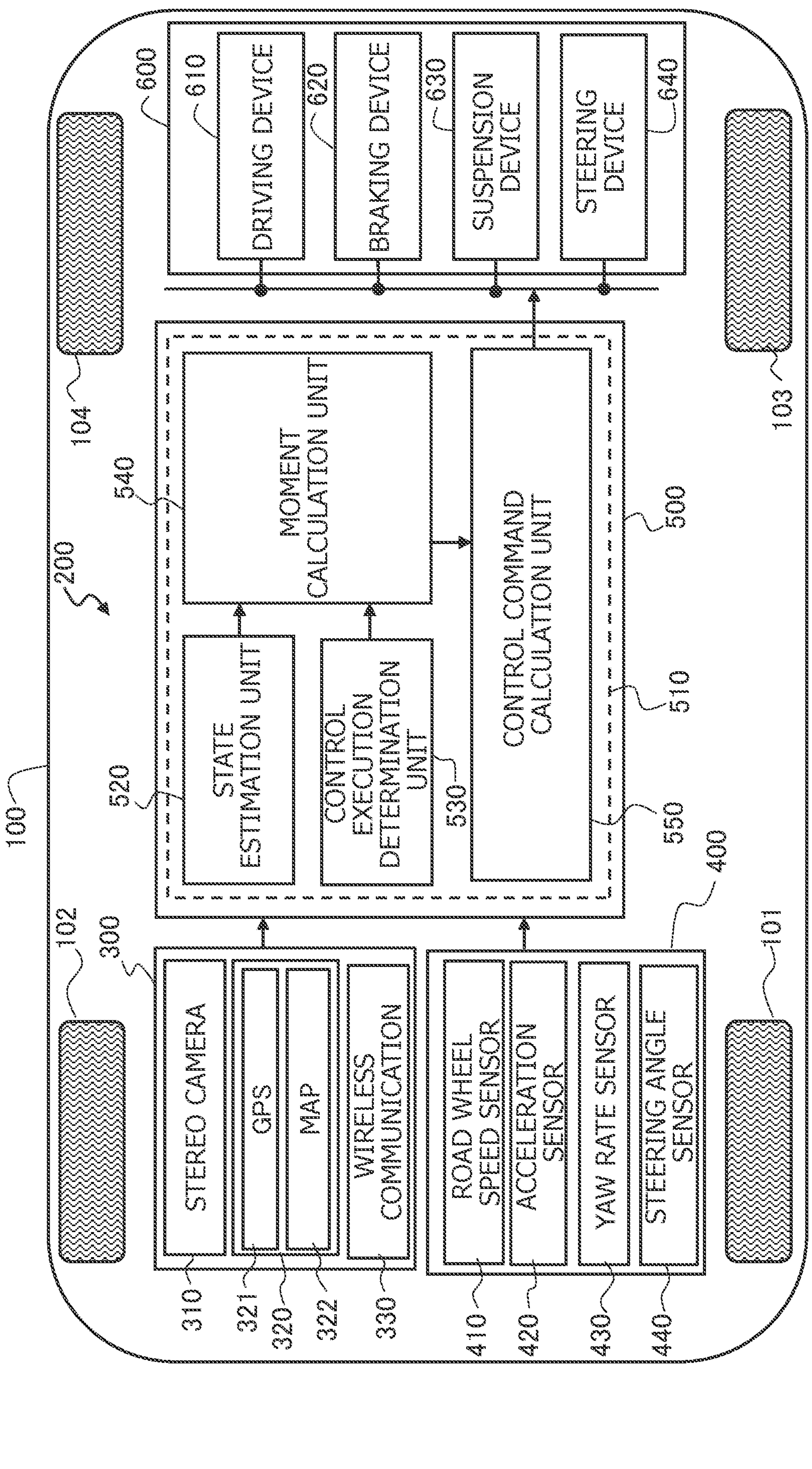
FIG. 1 is a block diagram illustrating a vehicle control system.

FIG. 1 is a block diagram illustrating a mode of a vehicle control system 200 mounted in a vehicle 100.

Vehicle 100 is a four-wheel automobile having a pair of right and left front road wheels 101 and 102 and a pair of right and left rear road wheels 103 and 104.

Vehicle control system 200 includes a surrounding area information recognition unit 300, a vehicle motion state acquisition unit 400, a vehicle control apparatus 500, and an actuator unit 600.

Surrounding area information recognition unit 300 collects information about the surrounding area ahead of vehicle 100 on the running path on which vehicle 100 is running, and outputs, as an electric signal or data, the collected surrounding area information.

In one mode, surrounding area information recognition unit 300 includes a stereo camera 310, a navigation device 320, and a wireless communication device 330.

Stereo camera 310 captures an image of the surrounding area of vehicle 100, acquires image information about the surrounding area of vehicle 100, and measures the distance to a target object based on a triangulation method.

Navigation device 320 includes a GPS reception unit 321 and a map database 322.

GPS reception unit 321 measures the latitude and longitude of the location of vehicle 100 by receiving signals from GPS (Global Positioning System) satellites.

Map database 322 is configured in a storage device mounted in vehicle 100.

The map information in map database 322 includes information about road locations, road shapes, intersection locations, etc.

Navigation device 320 refers to map database 322 based on the information about the location of vehicle 100 measured by GPS reception unit 321, determines the road on which vehicle 100 is running, and sets a route to the destination of vehicle 100.

Wireless communication device 330 performs a road-to-vehicle communication and/or a vehicle-to-vehicle communication.

The road-to-vehicle communication is a wireless communication between vehicle 100 (in other words, its host vehicle) and a roadside device installed along the road on which vehicle 100 is running.

The vehicle-to-vehicle communication is a wireless communication between vehicle 100 (in other words, its host vehicle) and another vehicle.

When performing the road-to-vehicle communication, wireless communication device 330 transmits information about its host vehicle such as the speed and the running location of its host vehicle to a roadside device, and receives road traffic information such as curves and intersections and information about other vehicles from the roadside device.

When performing the vehicle-to-vehicle communication, wireless communication device 330 transmits information about its host vehicle to another vehicle, and receives information about the other vehicle from the other vehicle.

Vehicle motion state acquisition unit 400 includes sensors for acquiring information about the motion state of vehicle 100, converting the information into electric signals or data, and outputting the signals or data.

In one mode, vehicle motion state acquisition unit 400 includes a road wheel speed sensor 410, an acceleration sensor 420, a yaw rate sensor 430, and a steering angle sensor 440.

Road wheel speed sensor 410 detects the rotation speed of each of road wheels 101 to 104 of vehicle 100.

Acceleration sensor 420 detects the longitudinal acceleration and the lateral acceleration (in other words, the horizontal acceleration) of vehicle 100.

Yaw rate sensor 430 detects the yaw rate of vehicle 100.

Steering angle sensor 440 detects the steering angle of a steering device 640, which will be described below.

Steering angle sensor 440 detects a physical quantity about the turning angle of a tire or a steering wheel.

Actuator unit 600 controls the motion state of vehicle 100 based on control commands.

In one mode, actuator unit 600 includes a driving device 610 that applies driving force to the drive road wheels of vehicle 100, a braking device 620 that applies braking force to individual road wheels 101 to 104 of vehicle 100, a suspension device 630 that is able to adjust damping force for each of road wheels 101 to 104, and steering device 640 that changes the steering angle of front road wheels 101 and 102, which are the steered road wheels of vehicle 100.

Driving device 610 constitutes an in-wheel motor in each of road wheels 101 to 104, for example.

Braking device 620 is a hydraulic braking device that includes, for example, a hydraulic energy source such as a hydraulic pump and that can individually adjust the braking force applied to each of road wheels 101 to 104 by adjusting the hydraulic pressure applied to the brake cylinder of each of road wheels 101 to 104.

For example, suspension device 630 includes an energy source such as a hydraulic pump or an air pump and is a fully-active suspension that can adjust the damping force and the vehicle height or is a semi-active suspension that can adjust the damping force.

For example, steering device 640 is an electrically operated steering device including a motor that generates steering force applied to front road wheels 101 and 102.

Vehicle control apparatus 500 includes a microcomputer 510 (in other words, a control unit) that outputs a result calculated based on acquired information.

Microcomputer 510 includes a microprocessor unit (MPU), a read-only memory (ROM), and a random access memory (RAM), etc., which are not illustrated in FIG. 1.

Microcomputer 510 may be referred to as a micro controller unit (MCU), a processor, a processing device, an arithmetic device, or the like.

Vehicle control apparatus 500 (specifically, microcomputer 510) acquires information about the surrounding area ahead on the running path on which vehicle 100 is running from surrounding area information recognition unit 300, and acquires information about the motion state of vehicle 100 from vehicle motion state acquisition unit 400.

Next, vehicle control apparatus 500 calculates control commands for operating actuator unit 600 based on the acquired information, and specifically, calculates a driving command, a braking command, a damping force command, a vehicle height command, a steering angle command, etc., and controls the motion state of vehicle 100 by outputting the calculated control commands to actuator unit 600.

Vehicle control apparatus 500 has a function of generating a vehicle behavior for notifying an occupant in vehicle 100 in advance of change in running environment or motion state such as a turn or deceleration of vehicle 100 before this change occurs.

That is, when vehicle control apparatus 500 predicts change in running environment or motion state such as a turn or deceleration of vehicle 100, vehicle control apparatus 500 outputs control commands for generating a vehicle behavior based on the prediction result to actuator unit 600 and causes actuator unit 600 to intentionally generate a certain vehicle behavior before the change occurs. In this way, the occupant is notified in advance of occurrence of the change through the vehicle behavior.

Hereinafter, the control in which vehicle control apparatus 500 intentionally generates a certain vehicle behavior to notify the occupant in advance that change in running environment or motion state of vehicle 100 will occur will be referred to as vehicle behavior generation control.

Because vehicle control apparatus 500 executes the vehicle behavior generation control, the occupant in vehicle 100 can anticipate that the running environment or the motion state of vehicle 100 will change, and can intentionally or unintentionally assume a posture in preparation for the change in running environment or motion state of vehicle 100. In other words, the occupant can assume a posture to reduce body movement.

In the vehicle behavior generation control, as will be described in detail below, a moment is applied to vehicle 100 by controlling the braking force, the driving force, etc., and a roll behavior, a pitch behavior, or the like is generated.

The driving and braking control based on the vehicle behavior generation control is incorporated in driving and braking control for calculating a driving command value and a braking force command value from an acceleration target value calculated from driver operation or automated driving control, for example.

In automated driving control, based on the surrounding area information acquired by surrounding area information recognition unit 300, a target trajectory, including information about a running path, a target speed, and a target acceleration/deceleration speed, is planned, and control commands are output to actuator unit 600 such that vehicle 100 runs along the target trajectory.

Hereinafter, the vehicle behavior generation control will be described in detail.

Vehicle control apparatus 500 (specifically, microcomputer 510) includes, as functional units for executing the vehicle behavior generation control, a state estimation unit 520, a control execution determination unit 530, a target moment calculation unit 540, and a control command setting unit 550.

State estimation unit 520 is a functional unit for acquiring control conditions including at least one of information about the running environment and information about the motion state of vehicle 100 in a preview area ahead on the running path on which vehicle 100 is running.

Control execution determination unit 530 is a functional unit for determining whether to execute the vehicle behavior generation control.

Target moment calculation unit 540 is a functional unit for calculating a target moment for generating a vehicle behavior matching the control conditions acquired by state estimation unit 520.

Control command setting unit 550 is a functional unit for calculating control commands such as a driving command and a braking command such that the target moment calculated by target moment calculation unit 540 is generated and for outputting the calculated control commands to actuator unit 600.

Control command setting unit 550 starts outputting the control commands for generating the vehicle behavior matching the control conditions before vehicle 100 reaches the preview area from which the control conditions have been acquired and stops outputting the control commands when vehicle 100 enters the preview area.

Examples of the control conditions include an estimated lateral acceleration, which is the lateral acceleration predicted to occur in the preview area, and an estimated deceleration, which is the deceleration predicted to occur in the preview area.

Examples of the vehicle behavior matching the control conditions include a roll behavior, a pitch behavior, a yaw behavior, and a vertical behavior.

For example, when vehicle 100 approaches a curved area, vehicle control apparatus 500 calculates a target roll moment for generating a roll behavior of vehicle 100, based on information about the lateral acceleration of vehicle 100 predicted in the curved area ahead of vehicle 100, in other words, in the preview area of which the running path curvature is over a predetermined value.

Next, vehicle control apparatus 500 calculates control commands for generating the target roll moment, starts outputting the control commands to actuator unit 600 when vehicle 100 is located before the curved area, in other words, before it starts to turn, and stops outputting the control commands when vehicle 100 enters the curved area.

That is, vehicle control apparatus 500 generates the roll behavior of vehicle 100, to notify the occupant in advance of an entry into the curved area, that is, a turn of vehicle 100, before vehicle 100 enters the curved area.

In the above vehicle behavior generation control in which the occupant is notified that vehicle 100 is approaching the curve, vehicle control apparatus 500 can calculate the estimated lateral acceleration based on the curvature of the curve, which is information about the running environment of vehicle 100, and based on the speed of vehicle 100, which is information about the motion state of vehicle 100.

As the control conditions used in the vehicle behavior generation control for notifying the occupant that vehicle 1000 is approaching the curve, vehicle control apparatus 500 can use information about the curvature of the running path, which is information about the running environment of vehicle 100.

Vehicle control apparatus 500 can execute the vehicle behavior generation control for notifying the occupant in advance of the turn based on the control conditions, either in an automated driving state or in a manual driving state, in which vehicle 100 is manually operated by a driver.

Vehicle control apparatus 500 calculates a target pitch moment for generating a pitch behavior of vehicle 100, for example, based on information about the deceleration of vehicle 100 predicted in a deceleration area ahead of vehicle 100, in other words, in a preview area in which vehicle 100 is predicted to decelerate.

Next, vehicle control apparatus 500 calculates control commands for generating the target pitch moment, starts outputting the control commands to actuator unit 600 when vehicle 100 is located before the deceleration area, and stops outputting the control commands when vehicle 100 enters the deceleration area.

That is, vehicle control apparatus 500 generates the pitch behavior of vehicle 100 to notify the occupant in advance of an entry into the deceleration area before vehicle 100 enters the deceleration area.

Vehicle control apparatus 500 can use, as information about the estimated deceleration, information about the target deceleration in the target trajectory calculated based on information about the running environment in automated driving control.

In this case, vehicle control apparatus 500 calculates the deceleration area as a preview area in which the target deceleration exceeds a predetermined value and vehicle 100 is planned to decelerate, and calculates the target pitch moment based on the target deceleration in the deceleration area.

Even when vehicle 100 is manually operated by a driver, for example, there are cases in which surrounding area information recognition unit 300 recognizes that a traffic light ahead of vehicle 100 is red or that there is a stop sign ahead of vehicle 100, and vehicle control apparatus 500 can estimate the stopping location of vehicle 100.

In such a case, vehicle control apparatus 500 can estimate the deceleration, for example from the speed of vehicle 100 and the distance to the stopping place, and can notify the occupant in advance of the deceleration by generating a vehicle behavior such as a pitch behavior before the driver performs a deceleration operation, in other words, before vehicle 100 enters the deceleration area.

When vehicle 100 is manually operated, vehicle control apparatus 500 stops the vehicle behavior generation control by the time when the driver starts a deceleration operation at the latest.

In addition, when vehicle 100 is manually operated, if the estimated lateral acceleration calculated from the current speed of vehicle 100 and the curvature of the curve ahead is equal to or greater than a setting value, vehicle control apparatus 500 can estimate that vehicle 100 will decelerate to a speed such that the lateral acceleration generated when vehicle 100 runs on the curve falls below the setting value.

When there is a preceding vehicle, vehicle control apparatus 500 can estimate that vehicle 100 will decelerate from the speed of the preceding vehicle, the speed of its host vehicle, and the distance between these vehicles.

As described above, in the vehicle behavior generation control, microcomputer 510 of vehicle control apparatus 500 acquires control conditions including at least one of information about the running environment and information about the motion state of vehicle 100 in a preview area ahead of the running path on vehicle 100 is running.

Microcomputer 510 starts outputting the control commands for generating a vehicle behavior matching the control conditions before vehicle 100 reaches the preview area, and stops outputting the control commands when vehicle 100 enters the preview area.

The vehicle behavior generation control is not limited to the control for notifying the occupant in advance in vehicle 100 of a turn or deceleration of vehicle 100.

For example, vehicle control apparatus 500 may generate a vehicle behavior, to notify the occupant in advance of transition to acceleration, change in road gradient, change in transverse gradient of the road surface, running over a convex hump, an irregular road surface, change in road surface friction coefficient, etc.

Examples of the change in road surface friction coefficient include transition from a dry road surface having a great friction coefficient to a wet road surface having a lower friction coefficient.

"Notifying Occupant of Turn Through Roll Behavior"

Hereinafter, the vehicle behavior generation control for notifying an occupant in advance of a turn of vehicle 100, in other words, notifying an occupant in advance that vehicle 100 will be running on a curve, will be described in detail.

Figure 2:
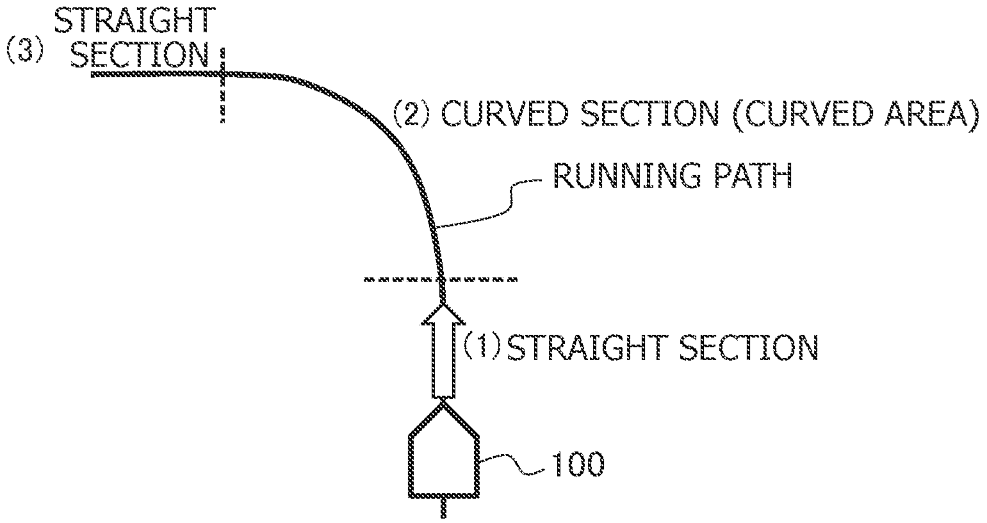
FIG. 2 illustrates a running pattern in which a vehicle turns.

FIG. 2 illustrates an example in which the running path of vehicle 100 changes from a first straight section on which vehicle 100 is currently running to a second straight section via a curved section (in other words, a curved area).

Figure 3:
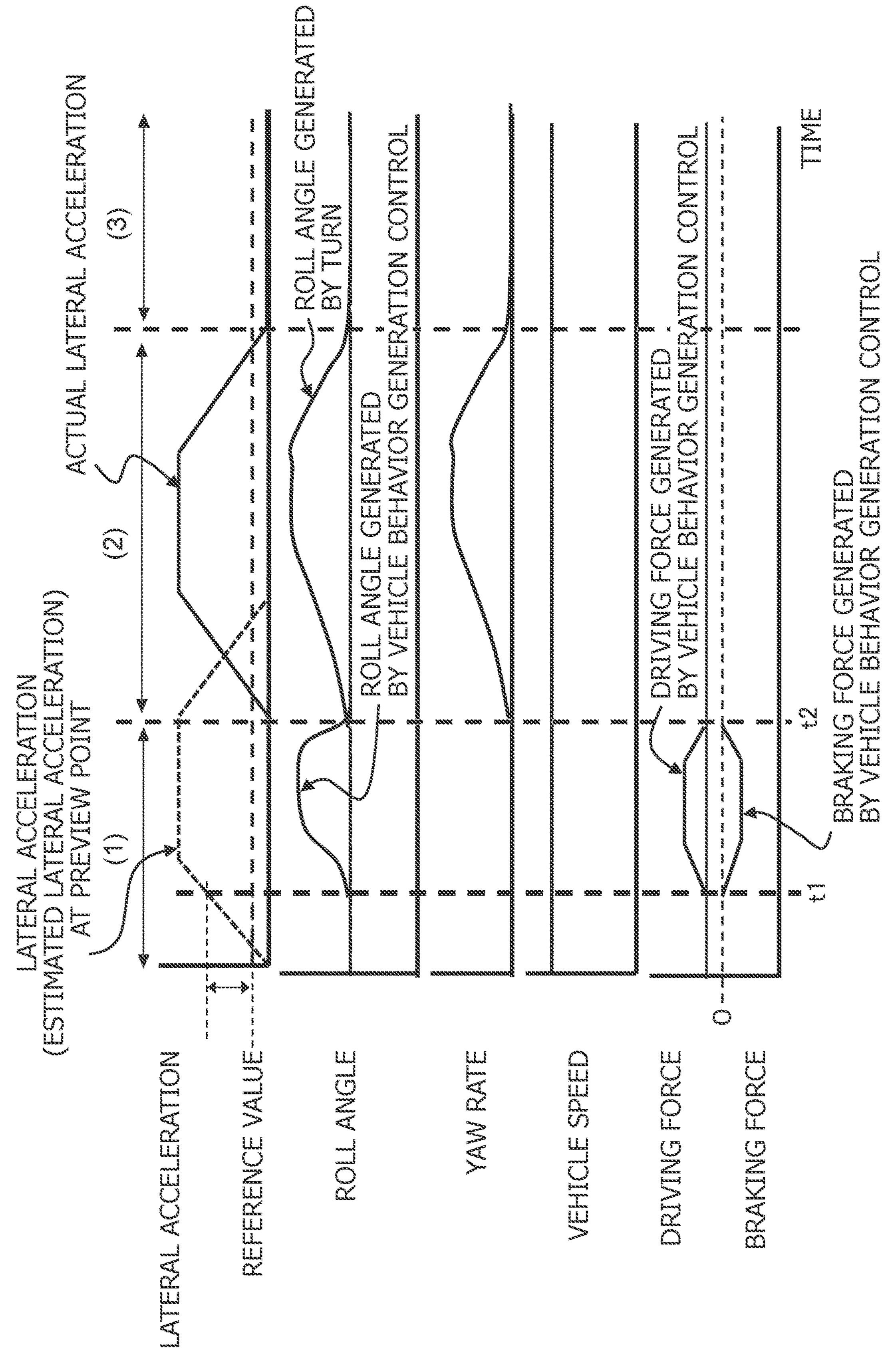
FIG. 3 is a time chart illustrating change in lateral acceleration, roll angle, braking force, driving force, etc., when the vehicle turns.

FIG. 3 is a time chart illustrating change in motion state (specifically, lateral acceleration, roll angle, yaw rate, speed) and change in driving and braking force of vehicle 100 when vehicle 100 runs on the running path illustrated in FIG. 2 and when the vehicle behavior generation control is executed.

When vehicle 100 runs on the running path illustrated in FIG. 2 at a certain speed, a lateral acceleration, a roll angle, and a yaw rate are generated in the curved section (curved area).

When vehicle 100 is running on the first straight section before the curved section, vehicle control apparatus 500 acquires information about the curvature and information about the speed of vehicle 100 at a preview point (in other words, at an estimation point) ahead of vehicle 100.

Next, based on the acquired information about the curvature and the speed, vehicle control apparatus 500 sequentially calculates the estimated lateral acceleration, which is the lateral acceleration estimated to occur when vehicle 100 runs on the curved section.

For example, the preview point is the location of vehicle 100 after a predetermined preview time (preview time=preview point distance/vehicle speed).

Vehicle control apparatus 500 may calculate the information about the curvature as information about the curvature of road markings recognized by stereo camera 310.

Alternatively, vehicle control apparatus 500 may determine the road on which its host vehicle is running from map database 322, and may search for information about the curvature of the road included in the map information.

If a target trajectory is planned in automated driving control, vehicle control apparatus 500 may set the curvature of the target trajectory (specifically, the target path) as a control condition of the vehicle behavior generation control.

The information about the speed of vehicle 100 is information about the actual current speed or the target speed at the preview point.

When the preview point is in the first straight section, because the curvature at the preview point is small, vehicle control apparatus 500 calculates the estimated lateral acceleration as approximately 0.

When the preview point falls within the curved section, because the curvature at the preview point is large, the estimated lateral acceleration calculated by vehicle control apparatus 500 is large. Next, when the preview point falls within the second straight section, vehicle control apparatus 500 calculates the estimated lateral acceleration as approximately 0.

When the estimated lateral acceleration exceeds a threshold (at time t1 in FIG. 3), vehicle control apparatus 500 predicts that vehicle 100 will be turning in the future, in other words, that vehicle 100 is running on a curve, and determines to execute the control for generating a vehicle behavior for notifying the occupant in advance of the turn of vehicle 100, that is, determines to execute the vehicle behavior generation control.

Specifically, vehicle control apparatus 500 generates a roll behavior of vehicle 100 before vehicle 100 turns, by outputting the control commands for the driving force and braking force matching the target roll moment calculated based on the estimated lateral acceleration (see FIG. 3) to actuator unit 600.

Before the curve, vehicle control apparatus 500 generates a roll behavior in the same direction as the direction of the roll behavior generated when vehicle 100 runs on the curve ahead.

As described above, before vehicle 100 actually enters a curve, vehicle control apparatus 500 outputs the control commands for generating a roll behavior for notifying the occupant of an entry into the curve.

Next, when vehicle 100 enters the curve (time t2 in FIG. 2), vehicle control apparatus 500 stops outputting the control commands for generating the roll behavior for notifying the occupant of the entry into the curve.

With this roll behavior generated, the occupant in vehicle 100 can recognize in advance that vehicle 100 is approaching a curve, and can intentionally or unintentionally assume a posture in preparation for running of vehicle 100 on the curve, in other words, a posture that can reduce the occupant's body movement when vehicle 100 runs on the curve.

Before vehicle 100 enters the curve, that is, at a time point before time t2 in FIG. 3, vehicle control apparatus 500 can stop outputting the control commands for generating the roll behavior.

When vehicle 100 enters the curve (time t2 in FIG. 3), vehicle control apparatus 500 can start the process for stopping the output of the control commands for generating the roll behavior, for example, the process for gradually decreasing the driving force and the braking force for generating the roll behavior.

Vehicle control apparatus 500 can generate the roll behavior before vehicle 100 turns, by outputting, to actuator unit 600, control commands matching the target roll moment calculated based on curvature information.

The vehicle behavior for notifying the occupant that vehicle 100 is approaching a curve is not limited to a roll behavior. For example, vehicle control apparatus 500 may notify the occupant that vehicle 100 is approaching a curve by generating a yaw behavior or by using a combination of a roll behavior and a yaw behavior.

Vehicle control apparatus 500 may notify the occupant that vehicle 100 is approaching a curve by outputting a control command to suspension device 630, which then generates a vertical vehicle behavior.

"Notifying Occupant of Deceleration Through Pitch Behavior"

Next, the vehicle behavior generation control for notifying an occupant in advance of deceleration of vehicle 100 will be described in detail.

Figure 4:
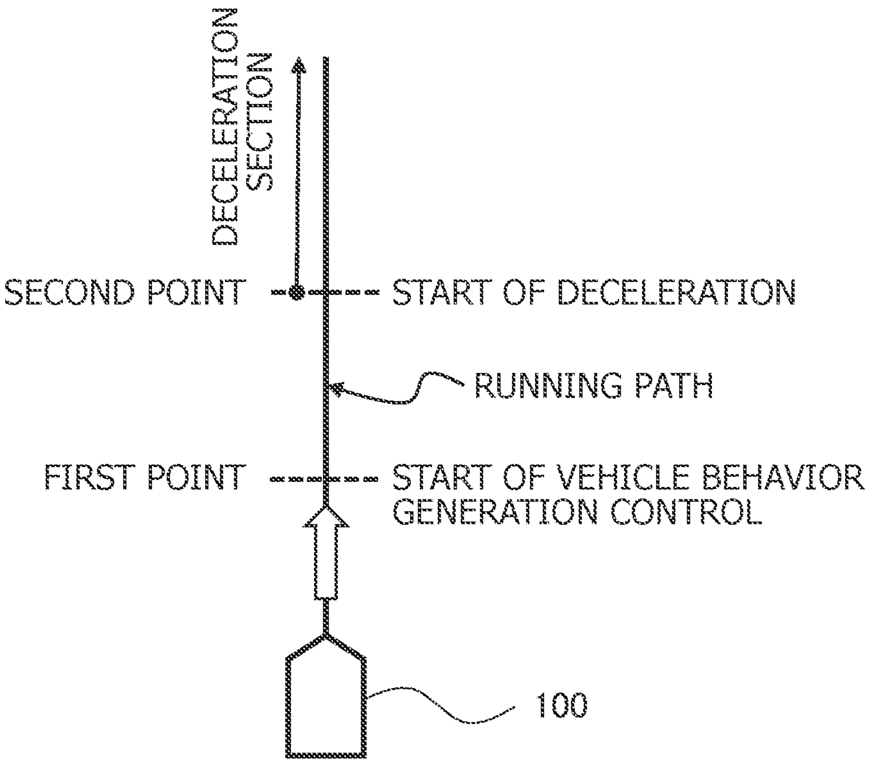
FIG. 4 illustrates a running pattern in which the vehicle decelerates.

FIG. 4 illustrates a running pattern in which vehicle 100 running on a straight path starts to decelerate at a second point ahead.

Figure 5:
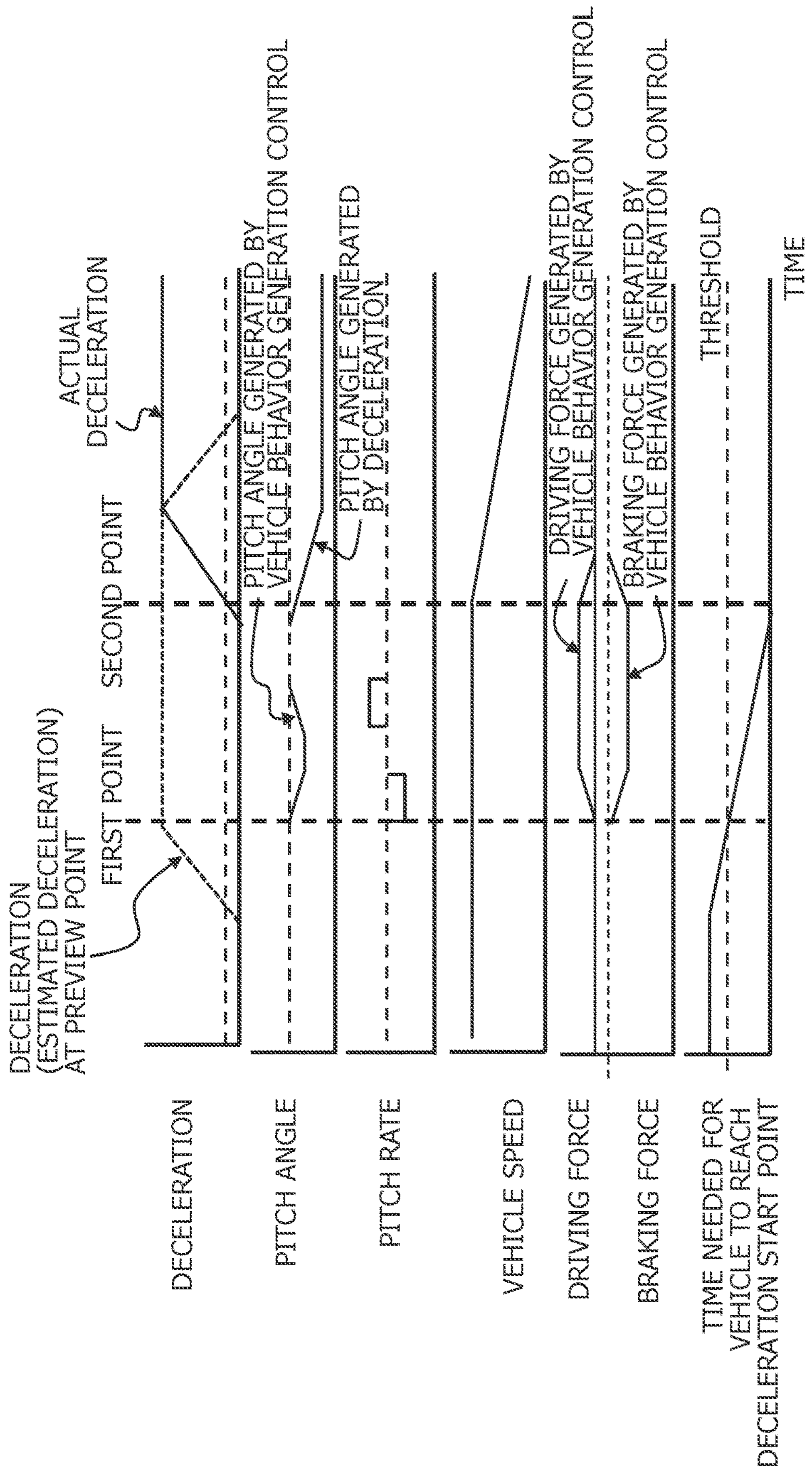
FIG. 5 is a time chart illustrating change in deceleration, pitch angle, braking force, driving force, etc., when the vehicle decelerates.

FIG. 5 is a time chart illustrating change in motion state (specifically, deceleration, pitch angle, pitch rate, speed) and change in driving and braking force of vehicle 100 when vehicle 100 runs in the running pattern illustrated in FIG. 4 and when vehicle control apparatus 500 executes the vehicle behavior generation control.

When vehicle 100 runs in the running pattern illustrated in FIG. 4, vehicle 100 is given braking force and decelerates in the deceleration section after the second point (after time t2 in FIG. 5), and a pitch angle, that is, a nosedive, is consequently generated.

Vehicle control apparatus 500 acquires information about an estimated deceleration, which is information about the deceleration at a preview point when vehicle 100 is running before the second point, which is the deceleration start point.

Next, vehicle control apparatus 500 predicts future deceleration at a point at which the estimated deceleration exceeds a threshold, that is, at a first point (time t1 in FIG. 5) before the second point, and determines to execute the control for generating a vehicle behavior for notifying the occupant in advance of the deceleration of vehicle 100, that is, determines to execute the vehicle behavior generation control.

Specifically, vehicle control apparatus 500 generates a pitch behavior of vehicle 100 before vehicle 100 decelerates, that is, at the first point in FIG. 4, by outputting control commands for the driving force and braking force (see FIG. 5) matching the target pitch moment calculated based on the estimated deceleration to actuator unit 600.

Vehicle control apparatus 500 generates a pitch behavior (in other words, a nosedive) in the same direction as that in the deceleration state, as the pitch behavior based on the vehicle behavior generation control.

Next, when vehicle 100 reaches the second point, which is the deceleration start point, vehicle control apparatus 500 stops outputting the control commands for generating the pitch behavior for notifying the occupant of the deceleration of vehicle 100.

The occupant in vehicle 100 can recognize in advance the start of the deceleration of vehicle 100 based on the generated pitch behavior of vehicle 100, and can intentionally or unintentionally assume a posture in preparation for the deceleration of vehicle 100, in other words, can assume a posture that reduces the occupant's body movement when vehicle 100 decelerates.

Before vehicle 100 starts to decelerate, vehicle control apparatus 500 can stop outputting the control commands for generating the pitch behavior. Alternatively, vehicle control apparatus 500 can start the process for stopping the output of the control commands for generating the pitch behavior after vehicle 100 starts to decelerate.

The vehicle behavior for notifying the occupant of the deceleration of vehicle 100 is not limited to a pitch behavior. For example, vehicle control apparatus 500 may notify the occupant of the start of the deceleration through a yaw behavior or a vertical vehicle behavior.

"Roll Behavior Generation Control"

Figure 6:
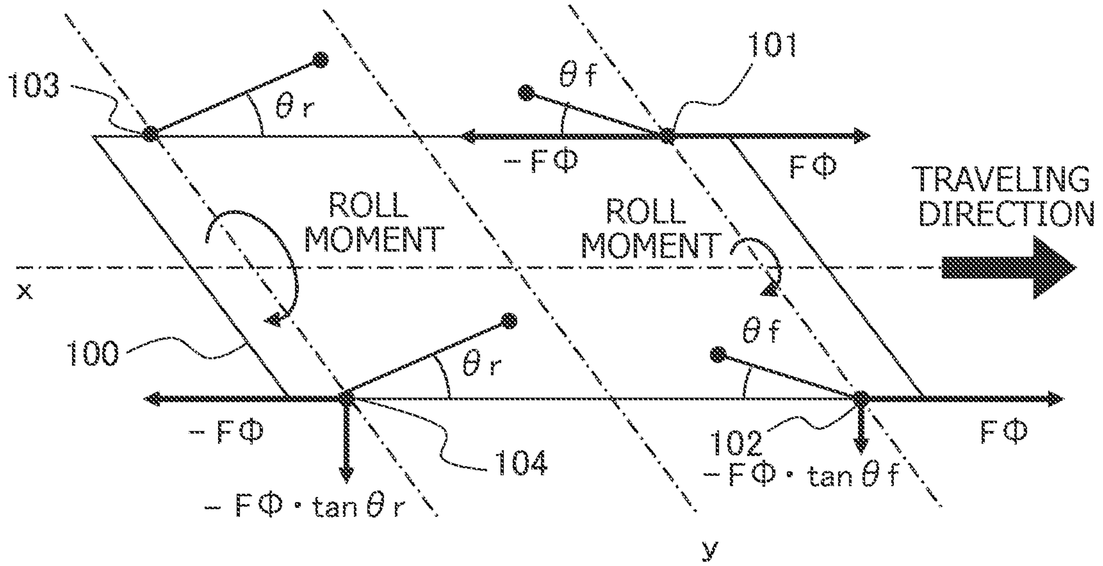
FIG. 6 illustrates settings of braking force and driving force for generating a roll moment.

FIG. 6 illustrates a mode of a method for giving a roll moment to vehicle 100 by controlling the driving force and braking force applied to road wheels 101 to 104 and generating a roll behavior of vehicle 100 in the vehicle behavior generation control.

FIG. 6 illustrates a state in which the driving force and braking force is controlled to generate a roll behavior in which the right side of vehicle 100 having at least front road wheels 101 and 102 as drive road wheels is lower than the left side of vehicle 100.

In addition, in FIG. 6, the angle of the virtual link of front road wheels 101 and 102 is denoted by θf, and the angle of the virtual link of rear road wheels 103 and 104 is denoted by θr (θr>θf).

In FIG. 6, vehicle control apparatus 500 applies driving force FΦ to left front road wheel 101 and right front road wheel 102, which are the drive road wheels, and applies braking force −FΦ to left front road wheel 101 and right rear road wheel 104.

If these driving and braking forces are applied to road wheels 101 to 104, anti-squat force Fas (Fas=−FΦ·tan θf) is applied to right front road wheel 102 by driving force FΦ. However, because driving force FΦ and braking force −FΦ are simultaneously applied to left front road wheel 101, driving force FΦ and braking force −FΦ balance out, and as a result, no anti-squat force Fas is applied to left front road wheel 101.

In other words, microcomputer 510 applies driving force FΦ to right front road wheel 102 in order to generate anti-squat force Fas, and applies driving force FΦ to left front road wheel 101. However, microcomputer 510 also applies braking force-FΦ matching driving force FΦ to left front road wheel 101, such that anti-squat force Fas will not be applied to left front road wheel 101 by driving force FΦ applied to left front road wheel 101.

In addition, anti-squat force Fas (Fas=−FΦ·tan θr) is applied to right rear road wheel 104 by braking force −FΦ.

However, because neither braking force −FΦ nor driving force FΦ is applied to left rear road wheel 103, neither anti-dive force Fad nor anti-squat force Fas is applied to left rear road wheel 103.

That is, in the driving and braking state illustrated in FIG. 6, while neither anti-dive force Fad nor anti-squat force Fas is applied to left front road wheel 101 and left rear road wheel 103, anti-squat force Fas (Fas=−FΦ·tan θf) is applied to right front road wheel 102 and right rear road wheel 104.

Thus, by applying the driving and braking force to road wheels 101 to 104 as illustrated in FIG. 6, vehicle control apparatus 500 can apply a roll moment to vehicle 100 and can generate a roll behavior in which the left side of vehicle 100 is higher than the right side of vehicle 100. In other words, vehicle 100 can assume a roll orientation in which the left side of vehicle 100 is higher than the right side of vehicle 100.

In addition, since vehicle control apparatus 500 applies driving force FΦ and braking force −FΦ to left front road wheel 101, applies driving force FΦ to right front road wheel 102, and applies braking force −FΦ to right rear road wheel 104, driving force FΦ and braking force −FΦ balance out on each of the right and left sides of vehicle 100.

Thus, vehicle control apparatus 500 can cause vehicle 100 to assume a roll behavior without generating longitudinal or lateral acceleration in vehicle 100.

When causing vehicle 100 to assume a roll orientation in the direction opposite to that illustrated in FIG. 6, vehicle control apparatus 500 applies driving force FΦ to left front road wheel 101 and right front road wheel 102, which are the drive road wheels, and applies braking force −FΦ to right front road wheel 102 and left rear road wheel 103.

As described above, vehicle control apparatus 500 can generate a roll behavior before vehicle 100 enters a turning area by controlling the driving force and the braking force for road wheels 101 to 104, and can control the roll angle to an angle matching the lateral acceleration in the turning area by setting driving force Fθ and braking force −Fθ matching the target roll moment.

Thus, vehicle control apparatus 500 can set the magnitude of the roll angle of the roll behavior for notifying the occupant in advance of the turn of vehicle 100 to the magnitude matching the lateral acceleration generated in the turning area, and can notify the occupant in advance of an entry into the turning area and the magnitude of the lateral acceleration in the turning area.

In addition, when vehicle control apparatus 500 notifies the occupant of an entry into the turning area by generating the roll behavior, since vehicle control apparatus 500 causes vehicle 100 to assume a roll orientation in the same direction as the roll angle generated when vehicle 100 turns, the occupant can preliminarily assume a posture that the occupant will assume when vehicle 100 is turning, and can stably maintain the posture before and after vehicle 100 enters the turning area.

"Pitch Behavior Generation Control"

Figure 7:
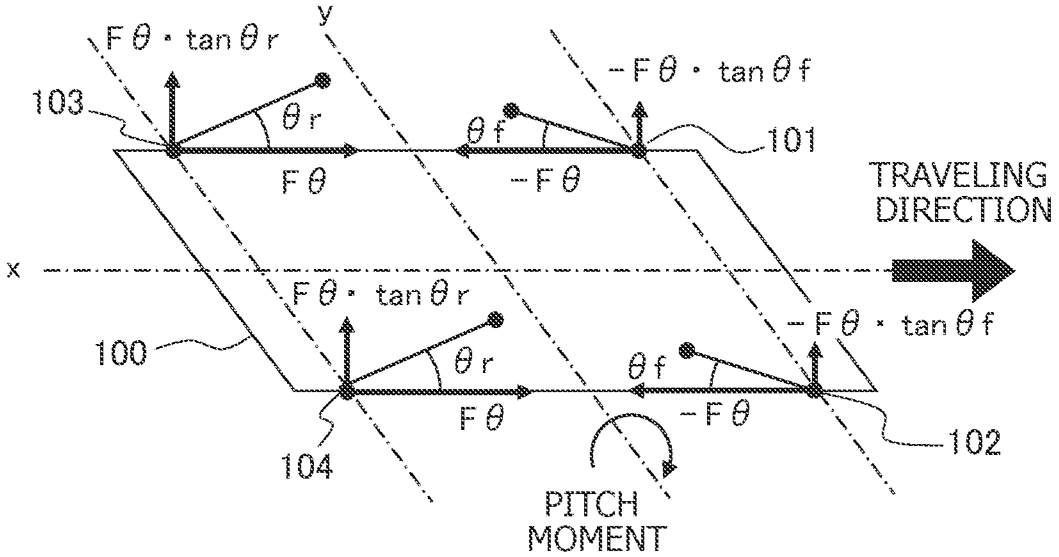
FIG. 7 illustrates settings of braking force and driving force for generating a pitch moment.

FIG. 7 is a mode of a method for giving a pitch moment to vehicle 100 having at least rear road wheels 103 and 104 as drive road wheels and generating a pitch behavior of vehicle 100 in the vehicle behavior generation control.

FIG. 7 illustrates a state in which the driving and braking force are controlled to generate a pitch behavior in which the front side of vehicle 100 is lowered, that is, vehicle 100 is in a nosedive state.

In FIG. 7, vehicle control apparatus 500 applies braking force −Fθ to left front road wheel 101, applies braking force-Fe to right front road wheel 102, applies driving force Fθ to left rear road wheel 103, and applies driving force Fθ to right rear road wheel 104.

In the driving and braking state illustrated in FIG. 7, anti-dive force Fad (Fad=Fθ·tan θf) is applied to left front road wheel 101 and right front road wheel 102, and anti-dive force Fad (Fad=Fθ·tan θr) is applied to left rear road wheel 103 and right rear road wheel 104.

Based on the difference between the virtual link angles θf and θr (θf<θr) of the front and rear road wheels, a difference is caused between anti-dive force Fad applied to left front road wheel 101 and right front road wheel 102 and anti-dive force Fad applied to left rear road wheel 103 and right rear road wheel 104. As a result, there is generated a pitch moment, which is the force that rotates the vehicle body about the Y axis going through the center of mass of vehicle 100 in the lateral direction.

In FIG. 7, because virtual link angles θf and Or satisfy θf<θr, anti-dive force Fad applied to left front road wheel 101 and right front road wheel 102 is less than anti-dive force Fad applied to left rear road wheel 103 and right rear road wheel 104.

Thus, by applying the driving and braking force to road wheels 101 to 104 as illustrated in FIG. 7, vehicle control apparatus 500 can obtain a pitch moment that lowers the front side of vehicle 100 and can generate a pitch behavior in the same direction as the nosedive associated with the deceleration.

In addition, since vehicle control apparatus 500 applies braking force −FΦ to left front road wheel 101, applies driving force FΦ to left rear road wheel 103, applies braking force-FΦ to right front road wheel 102, and applies driving force FΦ to right rear road wheel 104, driving force FΦ and braking force −FΦ balance out on each of the right and left sides of vehicle 100.

Thus, vehicle control apparatus 500 can generate a pitch behavior without generating longitudinal or lateral acceleration in vehicle 100.

As described above, vehicle control apparatus 500 can generate a pitch behavior before vehicle 100 enters a deceleration area by controlling the driving and braking force for road wheels 101 to 104, and can set the pitch angle to an angle matching the deceleration in the deceleration area by setting driving force Fθ and braking force −Fθ matching the target pitch moment.

Thus, vehicle control apparatus 500 can set the magnitude of the pitch angle of the pitch behavior for notifying the occupant in advance of the deceleration of vehicle 100 to the magnitude matching the deceleration, and can notify the occupant in advance of an entry into the deceleration area and the magnitude of the deceleration in the deceleration area.

In addition, when vehicle control apparatus 500 notifies the occupant of an entry into the deceleration area by generating a pitch behavior, since vehicle control apparatus 500 causes to vehicle 100 to assume a pitch orientation in the same direction as a nosedive associated with the deceleration of vehicle 100, the occupant can preliminarily assume a posture for the deceleration of vehicle 100, and can stably maintain the posture before and after vehicle 100 enters the deceleration area.

"Vehicle Behavior Generation Patterns"

Next, vehicle behavior generation patterns in the vehicle behavior generation control will be described.

Figure 8:
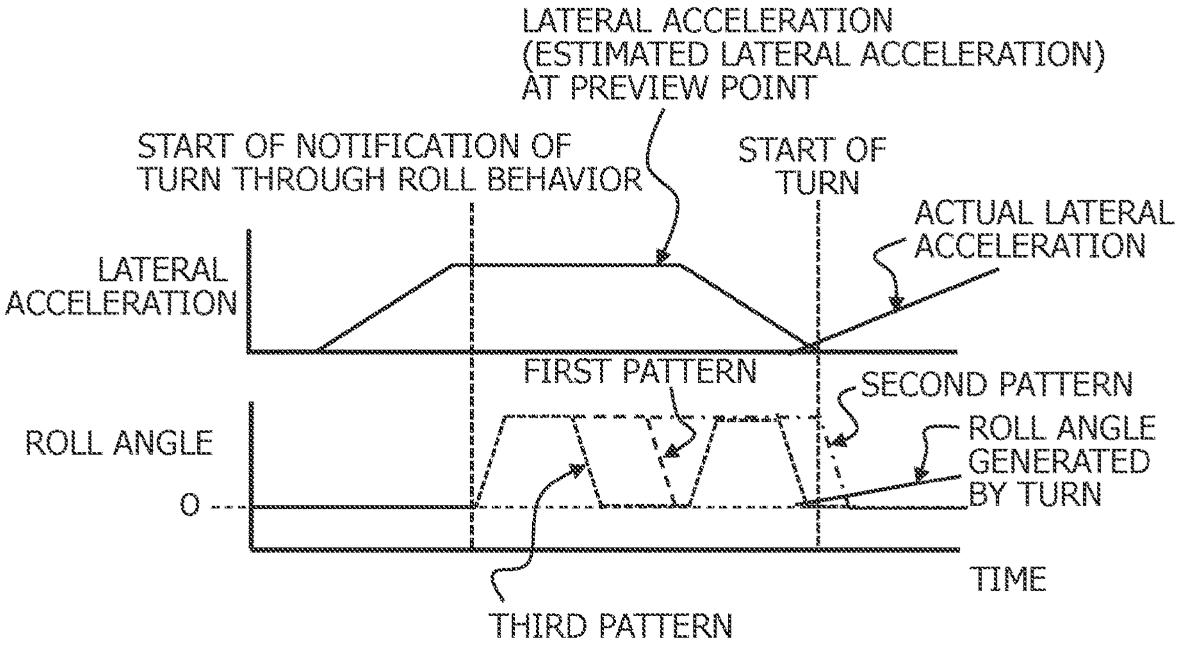
FIG. 8 is a time chart illustrating roll behavior generation patterns.

FIG. 8 illustrates first to third patterns as generation patterns of a roll behavior, which is an example of vehicle behavior.

The first pattern in FIG. 8 is a pattern in which vehicle control apparatus 500 stops generating a roll behavior for notifying an occupant in advance of a turn before vehicle 100 starts the turn.

The second pattern illustrated in FIG. 8 is a pattern in which vehicle control apparatus 500 continues the generation of a roll behavior for notifying the occupant in advance of a turn until vehicle 100 starts the turn.

The third pattern illustrated in FIG. 8 is a pattern in which vehicle control apparatus 500 generates a roll behavior for notifying the occupant in advance of a turn a plurality of times between when vehicle control apparatus 500 starts the notification and when vehicle 100 starts the turn.

That is, in the third pattern, vehicle control apparatus 500 first generates a roll behavior for notifying the occupant in advance of a turn for a first time period, and next stops the generation of the roll behavior for a second time period. Finally, vehicle control apparatus 500 generates the roll behavior for notifying the occupant in advance of the turn again for a third time period.

Vehicle control apparatus 500 may adopt any one of the above first to third patterns for the control for generating a pitch behavior for notifying an occupant in advance of deceleration of vehicle 100.

Vehicle control apparatus 500 uses previously adjusted values as the number of vehicle behaviors to be generated and the duration of a vehicle behavior such as a roll behavior or a pitch behavior generated by the vehicle behavior generation control, and as the speed of change in vehicle behavior (specifically, the roll angle or the pitch angle), such that the occupant will not have a sense of discomfort and can assume a posture in preparation for a turn, deceleration, etc., and such that good energy efficiency can be achieved.

In addition, vehicle control apparatus 500 variably sets the magnitude of a vehicle behavior generated by the vehicle behavior generation control based on the estimated lateral acceleration or estimated deceleration within a magnitude range of which the lower limit corresponds to the least vehicle behavior that the occupant can detect and in which the occupant does not feel a sense of anxiety.

As the generation timing of a vehicle behavior generated by the vehicle behavior generation control, vehicle control apparatus 500 can use a previously adjusted generation timing, for example, based on the time needed by the occupant to assume a posture in preparation for a turn or deceleration of vehicle 100 from when the occupant detects a change in behavior of vehicle 100.

"Speed of Change in Driving and Braking Force in Vehicle Behavior Generation Control"

Next, the speed of change in driving force and braking force when vehicle control apparatus 500 generates a vehicle behavior by executing the vehicle behavior generation control will be described.

When vehicle control apparatus 500 executes the vehicle behavior generation control to generate a vehicle behavior, vehicle control apparatus 500 outputs the control commands to driving device 610 and braking device 620 such that the driving force and the braking force change more slowly at the start of the vehicle behavior generation control than at the end of the vehicle behavior generation control, in other words, such that the driving force and the braking force change more slowly at the start of the output of the control commands for the driving force and the braking force than at the end of the output of the control commands.

As illustrated in FIG. 6 or FIG. 7, vehicle control apparatus 500 generates a vehicle behavior (specifically, a roll behavior or a pitch behavior) by controlling the braking force and the driving force in parallel.

Thus, the acceleration of vehicle 100 may vary depending on the difference between the control response of the braking force applied by braking device 620 and the control response of the driving force applied by driving device 610.

Figure 9:
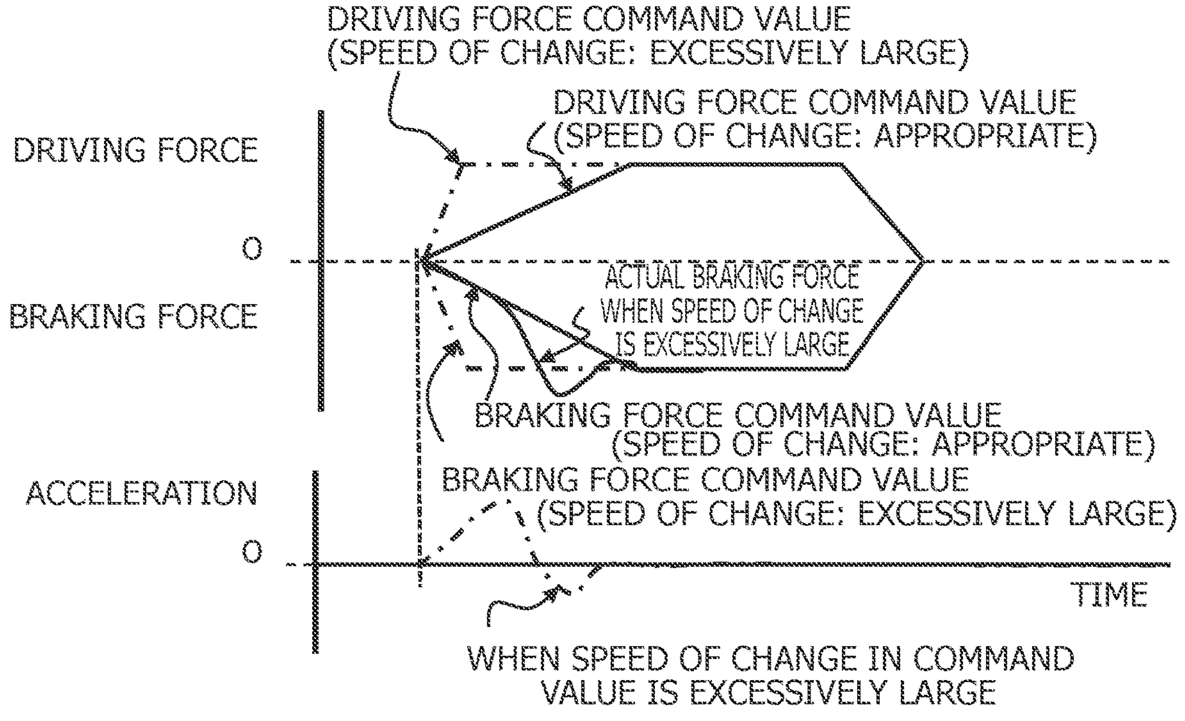
FIG. 9 is a time chart illustrating change in acceleration based on the speed of change in braking force and driving force.

FIG. 9 illustrates a case in which the acceleration of vehicle 100 varies with the vehicle behavior generation control when the speed of change in driving and braking force in the vehicle behavior generation control is excessively large.

For example, when braking device 620 is a hydraulic braking device and when the rising response of the braking force is slow, if the rising speed of the braking force command is excessively large, the increase of the braking force is delayed or the braking force overshoots with respect to the increase of the driving force applied by driving device 610. As a result, the braking force and the driving force become unbalanced, and the acceleration of vehicle 100 varies.

Thus, when vehicle control apparatus 500 executes the vehicle behavior generation control to generate a vehicle behavior, it is necessary to adjust the control command change speed to the slower of the responses of driving device 610 and braking device 620.

Even when the rising response of the braking force is slow, e.g., even when braking device 620 is a hydraulic braking device, the response of change in decrease of the braking force is faster than the rising response of the braking force.

Thus, when vehicle control apparatus 500 executes the vehicle behavior generation control to generate a vehicle behavior, vehicle control apparatus 500 outputs the control commands to driving device 610 and braking device 620 such that the driving force and the braking force change more slowly at the start of the output of the control commands for the driving force and the braking force than at the end of the output of the control commands (see FIG. 9).

In this way, it is possible to prevent the balance between the braking force and the driving force from becoming unbalanced and to prevent the acceleration of vehicle 100 from varying when vehicle control apparatus 500 generates a vehicle behavior such as a roll behavior or a pitch behavior by increasing the driving force and the braking force.

Vehicle control apparatus 500 sets the change speed of the control commands for the driving force and the braking force generated when the vehicle behavior generation control is ended to a change speed within a range in which the upper limit can be responded by driving device 610 and braking device 620, such that the behavior change is easily recognized by the occupant and is not too rapid.

Operational advantages of the vehicle behavior generation control executed by vehicle control apparatus 500 will be described separately, as an operational advantage of the preliminary notification, operational advantages of the notification through a vehicle behavior, an operational advantage of the end timing, and operational advantages in comparison to prior art.

"Operational Advantage of Preliminary Notification"

For example, JP 06-092159 A discloses control for notifying an occupant in vehicle 100 that the vehicle motion will be increased by a turn or the like by using sound, vibration, or the like after vehicle 100 starts the turn or the like.

However, with this notification control executed after a turn is started, if the occupant is not paying close attention to the road ahead of the vehicle, the occupant cannot recognize the turn in advance, resulting in unintended body movement when the vehicle starts to turn.

Thus, if the occupant is not paying close attention to the road ahead of the vehicle, the ride quality has already deteriorated at the start of the turn. Even if the occupant is notified that the vehicle motion will increase after the ride quality has already deteriorated, the ride quality of the occupant may not improve.

In contrast, in the case of the vehicle behavior generation control executed by vehicle control apparatus 500, before vehicle 100 starts to turn or decelerate, the occupant is notified that vehicle 100 will turn or decelerate in the future. Thus, the occupant can recognize that the force applied to the occupant by the vehicle motion will change in the future before this change occurs.

In addition, because the occupant can assume a posture in advance for reducing movement after recognizing the change in vehicle motion, the ride quality of the occupant improves.

"Operational Advantages of Notification Through Vehicle Behavior"

If sound or a display is used as a means for notifying an occupant in vehicle 100 of the motion of vehicle 100, the occupant may feel a sense of discomfort, and a device for this notification may additionally be needed.

In addition, for example, if the occupant is notified of the motion of vehicle 100 by giving vibrations to the occupant via a seat, the vibration that the occupant feels differs from change in acceleration that the occupant feels by a turn of vehicle 100.

Thus, the occupant needs to understand the meaning of the vibration from the seat and needs to determine whether to take an action based on the meaning. That is, the occupant cannot intuitively recognize that vehicle 100 will soon turn or decelerate.

In contrast, if the occupant is notified in advance of the motion of vehicle 100 through a vehicle behavior, the occupant can easily anticipate the motion of vehicle 100 that will occur after the notification, and can assume a posture more intuitively in preparation for change in acceleration generated by a turn or deceleration. In addition, the occupant can avoid feeling a sense of discomfort.

In addition, by matching the direction of the roll behavior generated for notifying the occupant in advance of a turn with the direction of the roll behavior generated when vehicle 100 turns, the occupant can unintentionally assume a posture matching the roll behavior generated when vehicle 100 turns at the time of the previous notification of the turn, and the ride quality of the occupant further improves.

Similarly, by matching the direction of the pitch behavior generated for notifying the occupant in advance of deceleration with the direction of a pitch behavior (in other words, a nosedive) generated when vehicle 100 decelerates, the occupant can unintentionally assume a posture matching the pitch behavior generated when vehicle 100 decelerates at the time of the notification in advance of the deceleration, and the ride quality of the occupant further improves.

In addition, because the vehicle behavior can be realized by controlling actuator unit 600 such as driving device 610 and braking device 620, no additional devices for the notification are needed.

"Operational Advantages of End Timing of Vehicle Behavior Generation Control"

In the vehicle behavior generation control executed by vehicle control apparatus 500, as described above, vehicle control apparatus 500 controls actuator unit 600 such as driving device 610 and braking device 620. However, there are cases in which when actuator unit 600 is operated by the vehicle behavior generation control, energy loss may be caused and power consumption may be increased.

If vehicle control apparatus 500 generates a vehicle behavior for a shorter time, energy loss or power consumption can be reduced.

Thus, vehicle control apparatus 500 stops outputting the control commands for generating a vehicle behavior when vehicle 100 enters a preview area such as a turning area or a deceleration area.

Figure 10:
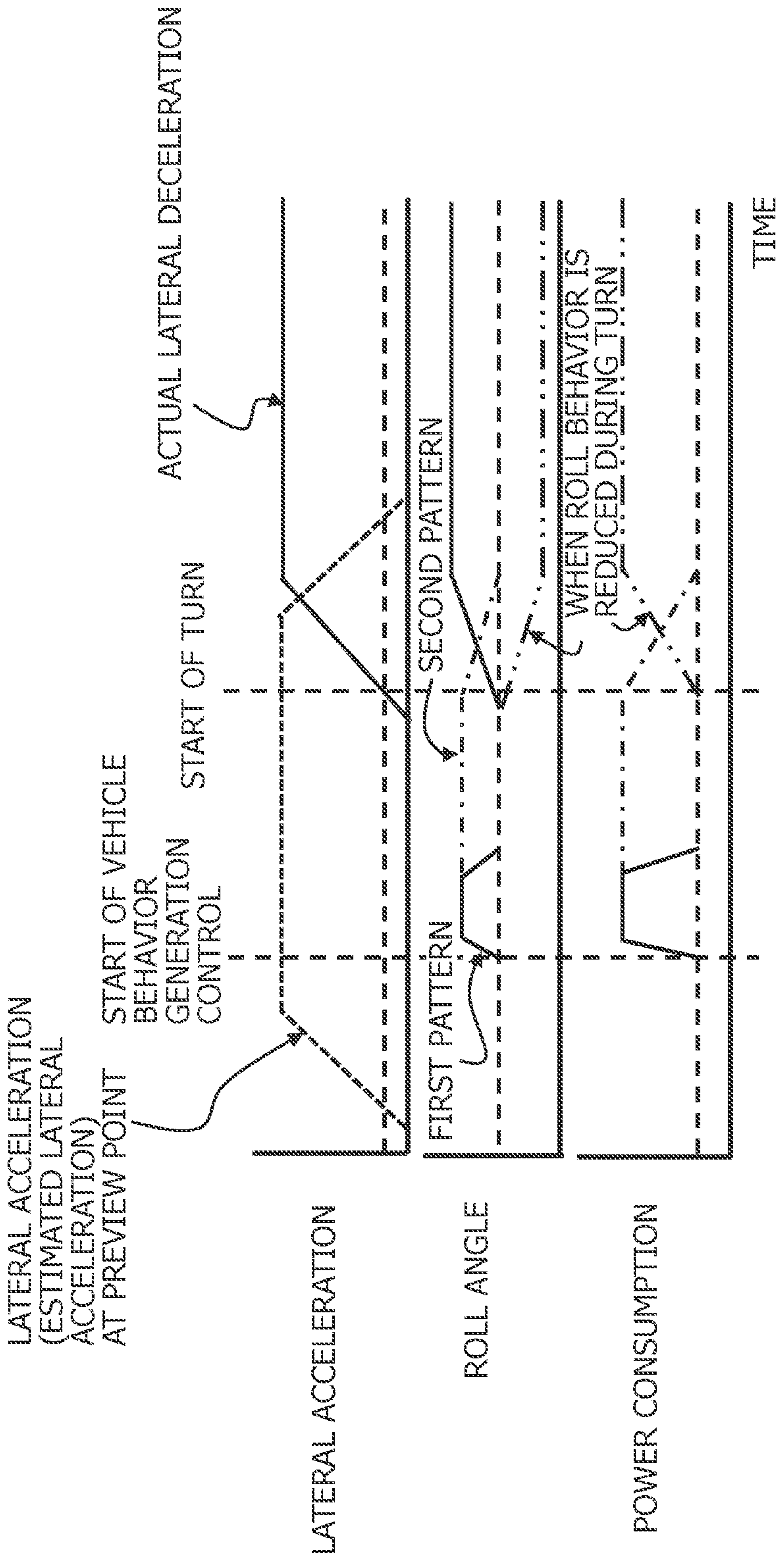
FIG. 10 is a time chart illustrating end timing patterns of vehicle behavior generation control.

FIG. 10 illustrates end timing patterns of the vehicle behavior generation control by using roll behavior generation control as an example.

A first pattern in FIG. 10 is a pattern in which vehicle control apparatus 500 stops generating a roll behavior in the vehicle behavior generation control before vehicle 100 enters a turning area (in other words, a preview area).

Of all the patterns in FIG. 10, this first pattern has the shortest behavior control time and achieves the least power consumption.

A second pattern in FIG. 10 is a pattern in which when vehicle 100 enters the turning area (in other words, the preview area), vehicle control apparatus 500 stops generating the roll behavior in the vehicle behavior generation control such that the roll behavior smoothly transitions to the roll behavior generated during the turn.

FIG. 10 also illustrates behavior reduction control in which vehicle control apparatus 500 continuously generates a roll moment in the direction opposite to the direction of the roll generated during the turn of vehicle 100, so as to reduce the roll behavior generated by the turn.

In the behavior reduction control, vehicle control apparatus 500 continuously generates a roll moment during the turn, resulting in greater power consumption than that of the vehicle behavior control in the first pattern or the second pattern.

That is, the vehicle behavior generation control is more advantageous than the behavior reduction control in terms of power consumption. By ending the vehicle behavior generation control within a short time, further reduction in power consumption can be achieved.

In addition, if vehicle control apparatus 500 ends the vehicle behavior generation control before vehicle 100 enters a turning area, because the vehicle behavior generation control does not interfere with other control executed during the turn, there is no need to execute a mediation process between the vehicle behavior generation control and other control. Therefore, control specifications can be simplified.

"Operational Advantage in Comparison to Prior Art (Part 1)"

JP 2016-178776 A (which will be referred to as a first prior art) discloses control for reducing the amount of change in angle of the neck of the driver based on a vehicle orientation state and a state of the human head, and giving, in advance, when change in vehicle behavior is predicted, the pitch angle of the vehicle.

However, the first prior art does not disclose stopping the generation of the vehicle behavior when the vehicle starts to turn or decelerate. Thus, it is considered that the control for giving the pitch angle of the vehicle will continue even after the vehicle starts to turn or decelerate.

That is, the first prior art does not disclose the vehicle behavior generation control of the present application. In addition, the vehicle behavior generation control of the present application has an advantageous effect of reducing energy consumption more than the pitch control disclosed in first prior art 1.

"Operational Advantage in Comparison to Prior Art (Part 2)"

JP 06-092159 A (which will be referred to as a second prior art) discloses, in addition to predicting a vehicle behavior change that occurs after a turn is started based on surrounding area information and vehicle state information and giving vibration to an occupant via a seat, control for vibrating the vehicle body with an active suspension and notifying the occupant of the vehicle behavior change.

However, the second prior art neither discloses notifying the occupant of the vehicle behavior change before the vehicle starts to turn or decelerate nor discloses stopping the control when the vehicle starts to turn or decelerate.

That is, the second prior art does not disclose notifying the occupant in advance of the start of a turn or deceleration by generating a vehicle behavior, and does not provide the operational advantage of allowing the occupant in the vehicle to easily assume a posture in preparation for change in running environment or motion state of the vehicle.

"Process of Vehicle Behavior Generation Control"

Hereinafter, a process of the vehicle behavior generation control will be described in detail.

Figure 11:
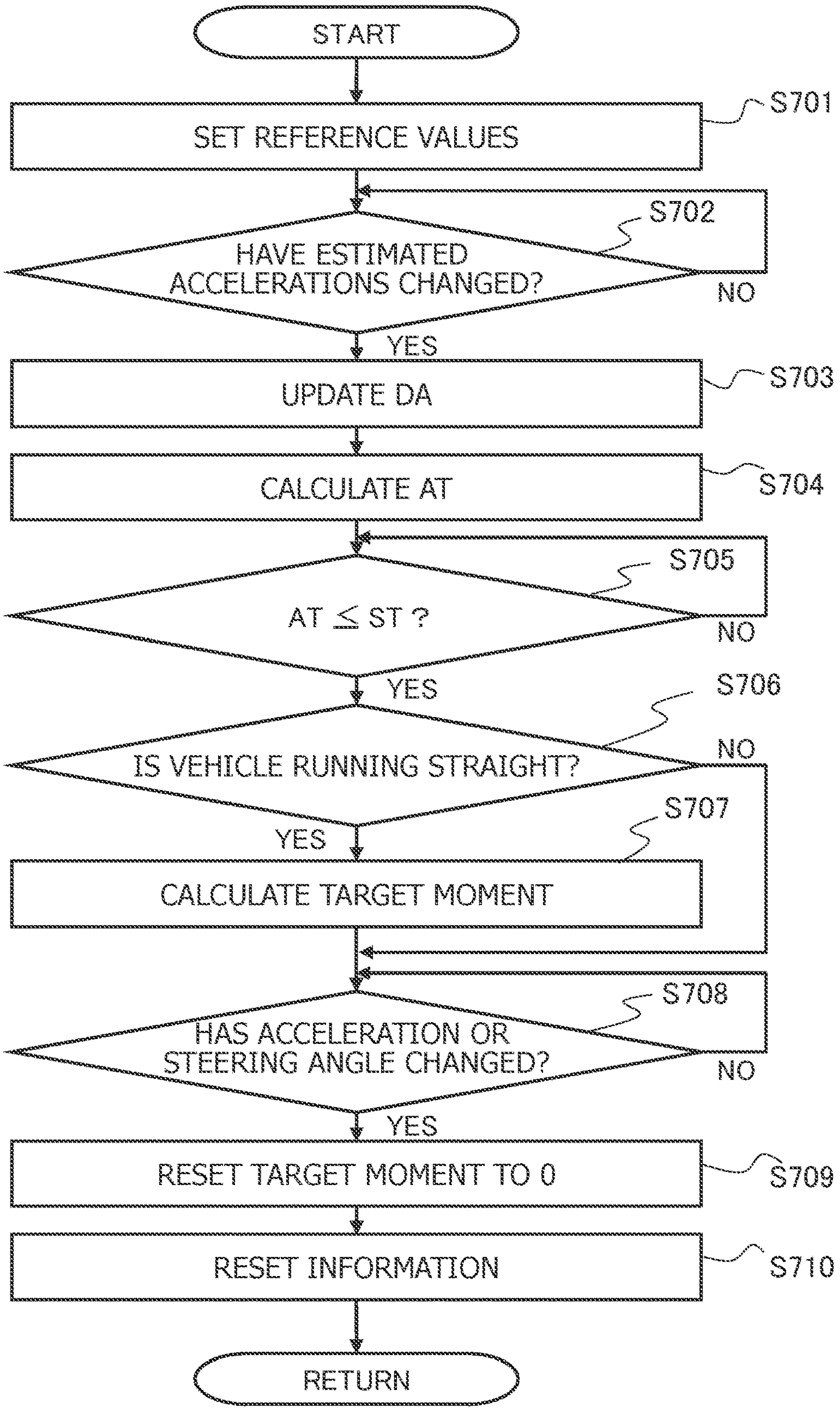
FIG. 11 is a flowchart illustrating a process of the vehicle behavior generation control.

FIG. 11 is a flowchart illustrating a process of the vehicle behavior generation control executed by microcomputer 510.

In step S701, microcomputer 510 acquires information about the actual lateral acceleration and the actual longitudinal acceleration, which is information about the lateral acceleration and the longitudinal acceleration of vehicle 100 detected by acceleration sensor 420.

In addition, in step S701, microcomputer 510 calculates an average value of the actual lateral acceleration and an average value of the actual longitudinal acceleration over a recent predetermined time.

Next, microcomputer 510 sets the average value of the actual lateral acceleration as a reference lateral acceleration, and sets the average value of the actual longitudinal acceleration as a reference longitudinal acceleration.

Next, in step S702, microcomputer 510 compares the estimated accelerations (specifically, the estimated lateral acceleration and the estimated deceleration) in a preview area with the reference accelerations (specifically, the reference lateral acceleration and the reference longitudinal acceleration), and determines whether the estimated accelerations have changed from the reference accelerations by a predetermined value or more.

If the estimated accelerations have not greatly changed from the reference accelerations, the process returns to step S701, and microcomputer 510 updates the reference accelerations.

If the estimated accelerations have changed from the reference accelerations by the predetermined value, the process proceeds to step S703.

In step S703, microcomputer 510 starts a process for updating a distance DA as vehicle 100 runs. The distance DA is the distance from vehicle 100 to the point at which the estimated accelerations, which have changed from the reference accelerations by the predetermined value, have been calculated (this point will be hereinafter referred to as estimated point EP).

Estimated point EP is the point at which vehicle 100 is estimated to start to turn or at which vehicle 100 is estimated to start to decelerate.

Next, in step S704, based on information about distance DA and information about the speed of vehicle 100, microcomputer 510 calculates arrival time AT needed for vehicle 100 to reach estimated point EP, in other words, the turning start point or the deceleration start point.

Next, in step S705, microcomputer 510 compares arrival time AT with control start time ST, which is as a setting value, and determines whether arrival time AT has reached control start time ST.

If arrival time AT is greater than control start time ST, in other words, if vehicle 100 has not sufficiently reached the turning area or the deceleration area, microcomputer 510 repeats the determination process in step S705, and waits for arrival time AT to reach control start time ST.

If arrival time AT reaches control start time ST, the process proceeds from step S705 to step S706, and microcomputer 510 determines whether vehicle 100 is running straight, specifically, whether the duration time of the straight-running state of vehicle 100 has exceeded a threshold, based on, for example, information about the steering angle of steering device 640.

If vehicle 100 is running straight, the process proceeds to step S707, and microcomputer 510 calculates, based on the difference between the reference accelerations and the estimated accelerations, a target moment for the vehicle behavior generation control, specifically, a target roll moment or a target pitch moment.

Microcomputer 510 outputs control commands to actuator unit 600 based on the target moment for the vehicle behavior generation control, and causes actuator unit 600 to generate a roll behavior or a pitch behavior for notifying the occupant in advance in vehicle 100 of, for example, the turn or deceleration of vehicle 100.

That is, microcomputer 510 uses the timing at which arrival time AT reaches control start time ST as the start timing of the vehicle behavior generation control, and starts to generate a roll behavior or a pitch behavior.

If vehicle 100 is not running straight, the process proceeds to step S708 by skipping step S707.

That is, if vehicle 100 is not running straight, microcomputer 510 does not calculate the target moment for generating a vehicle behavior (in other words, sets the target moment to 0), and substantially cancels the vehicle behavior generation control. Microcomputer 510 executes the vehicle behavior generation control based on the condition that vehicle 100 is running straight.

In step S708, microcomputer 510 determines whether vehicle 100 has entered the turning area or the deceleration area by determining whether the actual acceleration (specifically, the actual lateral acceleration or the actual longitudinal acceleration) has changed by a predetermined value or more or whether the steering angle of steering device 640 has changed by a predetermined value or more.

Microcomputer 510 repeats the determination in step S708 until microcomputer 510 detects that vehicle 100 has entered the turning area or the deceleration area based on the actual acceleration or the steering angle. If microcomputer 510 detects that vehicle 100 has entered the turning area or the deceleration area, the process proceeds to step S709.

In step S709, microcomputer 510 resets the target moment for the vehicle behavior generation control (specifically, the target roll moment or the target pitch moment) to 0.

That is, when vehicle 100 enters the turning area or the deceleration area, microcomputer 510 stops outputting the control commands based on the vehicle behavior generation control to actuator unit 600, and stops generating the vehicle behavior for notifying the occupant in advance of the turn or deceleration.

Next, in step S710, microcomputer 510 resets the information, such as the estimated accelerations, estimated point EP, and distance DA, stored in a working memory and used in the current vehicle behavior generation control, and ends the vehicle behavior generation control.

"Detailed Functions of Control Command Setting Unit 550"

Figure 12:
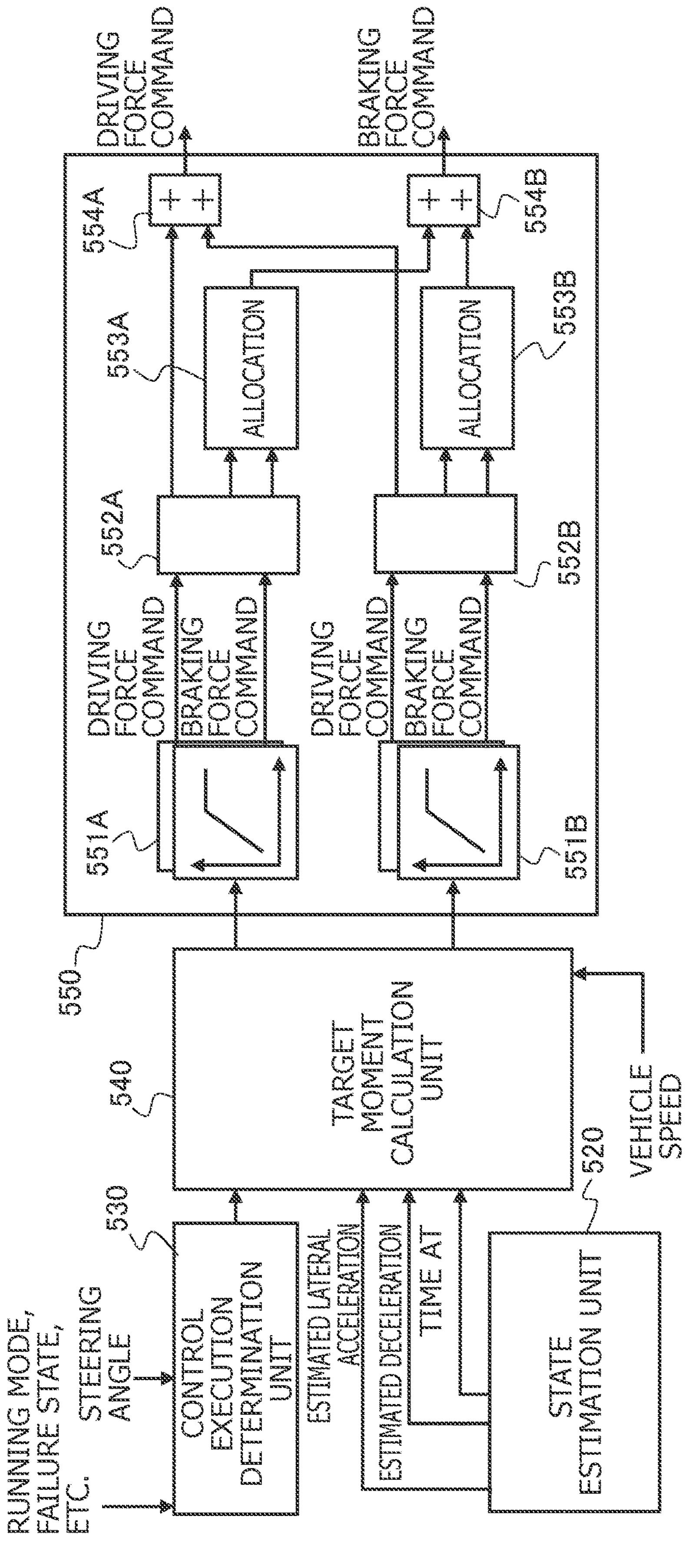
FIG. 12 is a block diagram illustrating functions of a control command setting unit in detail.

FIG. 12 is a block diagram illustrating functions of control command setting unit 550 in detail.

State estimation unit 520 calculates the estimated lateral acceleration, the estimated deceleration, arrival time AT, etc., and outputs these items of information to target moment calculation unit 540.

Control execution determination unit 530 acquires information about the running mode, the failure state, etc., and information about the steering angle, determines whether to execute the vehicle behavior generation control based on the acquired information, and outputs a signal indicating the determination result to target moment calculation unit 540.

As summarized with the flowchart in FIG. 11, target moment calculation unit 540 receives the estimated lateral acceleration, the estimated deceleration, arrival time AT, the speed of vehicle 100, a signal indicating whether to execute the vehicle behavior generation control, etc., and calculates a target moment for the vehicle behavior generation control (specifically, a target roll moment or a target pitch moment).

Control command setting unit 550 includes, as functional units for controlling a roll behavior, a command value map 551A, a rate limit and allocation ratio calculation unit 552A, and an allocation processing unit 553A, and includes, as functional units for controlling a pitch behavior, a command value map 551B, a rate limit and allocation ratio calculation unit 552B, and an allocation processing unit 553B.

Control command setting unit 550 also includes a driving force command output unit 554A that finally outputs a driving force command value for the vehicle behavior generation control, and includes a braking force command output unit 554B that finally outputs a braking force command value for the vehicle behavior generation control.

Command value map 551A acquires information about the target roll moment from target moment calculation unit 540, and determines driving force and braking force for obtaining the target roll moment.

Similarly, command value map 551B acquires information about the target pitch moment from target moment calculation unit 540, and determines driving force and braking force for obtaining the target pitch moment.

Rate limit and allocation ratio calculation units 552A and 552B each calculate the allocation ratio of the braking force applied to road wheels 101 to 104 and the upper limit value of the speed of change in driving force such that sharp acceleration change that can be perceived by the occupant or an unintended behavior in the yaw direction will not be caused.

Next, rate limit and allocation ratio calculation units 552A and 552B each output a driving force command that limits the speed in change based on the upper limit value to driving force command output unit 554A.

Allocation processing units 553A and 553B each define the braking force applied to road wheels 101 to 104 based on the allocation ratio calculated by rate limit and allocation ratio calculation units 552A and 552B, and output the braking force command to braking force command output unit 554B.

Driving force command output unit 554A acquires the driving force command value for the roll behavior and the driving force command value for the pitch behavior, and finally outputs a driving force command value for the vehicle behavior generation control.

Braking force command output unit 554B acquires the braking force command value for the roll behavior and the braking force command value for the pitch behavior, and finally outputs a braking force command value for the vehicle behavior generation control.

"Detailed Functions of Target Roll Moment Calculation Unit 540A"

Figure 13:
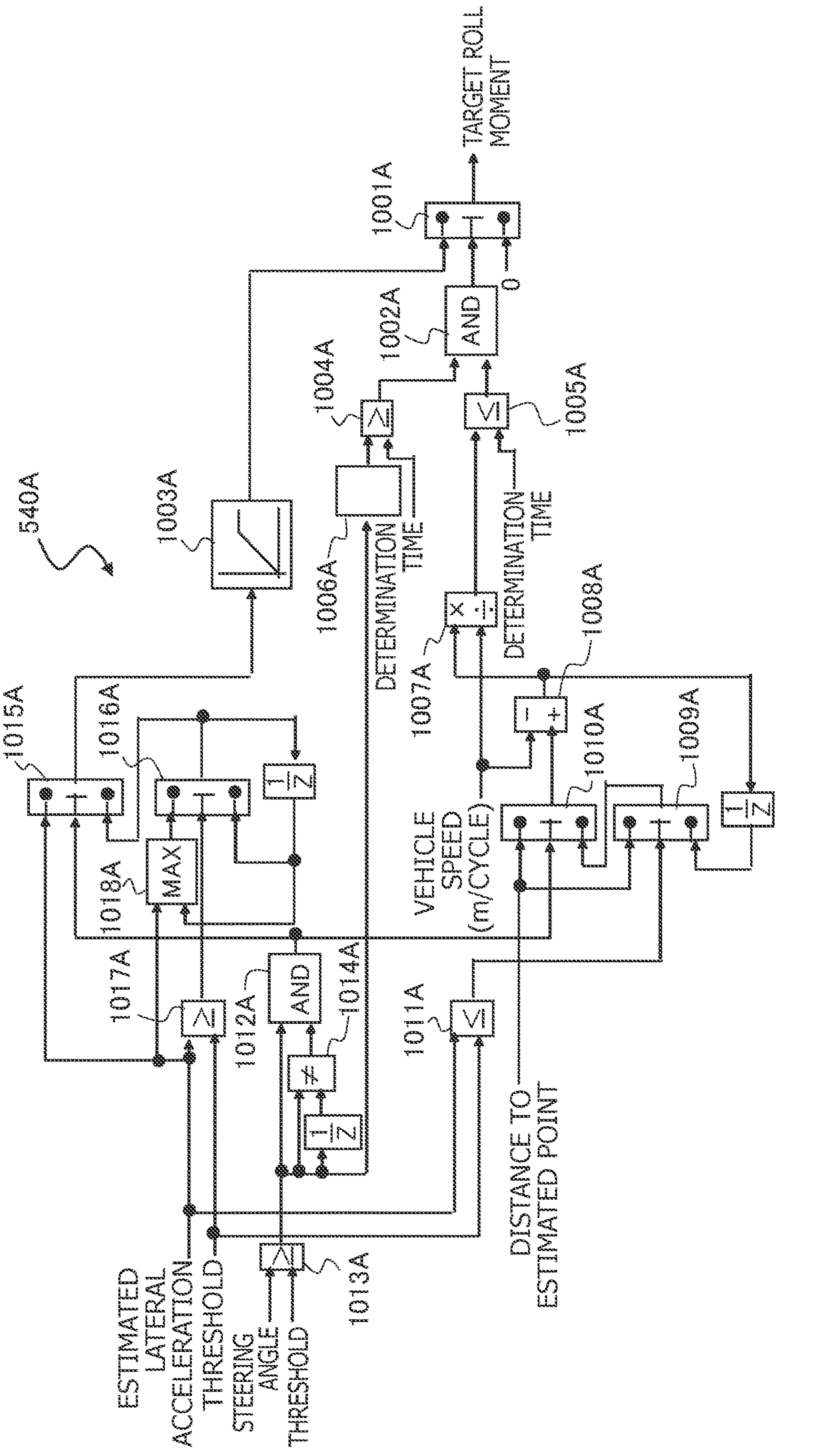
FIG. 13 is a block diagram illustrating details of a target roll moment calculation unit.

FIG. 13 is a block diagram illustrating details of target roll moment calculation unit 540A included in target moment calculation unit 540.

A target roll moment calculation unit 540A is a functional unit that calculates a target roll moment for generating a roll behavior.

A switching unit 1001A outputs either a target roll moment output by a table 1003A or target roll moment=0, based on the output of an AND unit 1002A.

Table 1003A calculates a target roll moment for generating a roll behavior for notifying the occupant in advance of a turn of vehicle 100 based on the estimated lateral acceleration, and outputs the calculated target roll moment.

AND unit 1002A outputs "1" when the output of a comparison unit 1004A is "1" and the output of a comparison unit 1005A is "1".

Switching unit 1001A outputs the target roll moment output by table 1003 when the output of AND unit 1002A is "1", and outputs target roll moment=0 when the output of AND unit 1002A is "0".

Comparison unit 1004A outputs "1" when the value of a timer 1006A that measures the duration time of the straight-running state of vehicle 100 reaches a predetermined determination time, and outputs "0" when the value of timer 1006A is less than the predetermined determination time.

Comparison unit 1005A determines whether arrival time AT, which has been described above and is the time needed for vehicle 100 to reach estimated point EP, has reached control start time ST.

Comparison unit 1005A outputs "1" when arrival time AT reaches control start time ST, and outputs "0" when arrival time AT exceeds control start time ST.

That is, when the duration time of the straight-running state of vehicle 100 is equal to or greater than a predetermined time and when arrival time AT is equal to or less than control start time ST, switching unit 1001A outputs the target roll moment calculated by table 1003A, that is, the target roll moment that generates a roll behavior for notifying the occupant in advance of a turn.

If at least one of the control conditions about the duration time of the straight-running state of vehicle 100 and arrival time AT is not met, switching unit 1001A outputs target roll moment=0, to cancel the generation of the roll behavior based on the vehicle behavior generation control.

A division unit 1007A calculates arrival time AT based on distance DA from vehicle 100 to estimated point EP and based on the speed of vehicle 100, and outputs information about calculated arrival time AT to comparison unit 1005A.

In addition, a subtraction unit 1008A updates the information about distance DA by performing a subtraction process based on the speed of vehicle 100, and outputs information about updated distance DA to division unit 1007A.

Distance DA on which subtraction unit 1008A executes the subtraction process is switched by switching units 1009A and 1010A between the previous output value of subtraction unit 1008A and the latest value of distance DA to estimated point EP.

Switching unit 1009A outputs either the previous output value of subtraction unit 1008A or the latest value of distance DA to estimated point EP, based on the output of a comparison unit 1011A.

Comparison unit 1011A compares the estimated lateral acceleration with a turning determination threshold, outputs "1" when the estimated lateral acceleration is equal to or less than the turning determination threshold and when a turn of vehicle 100 is not predicted, and outputs "0" when the estimated lateral acceleration exceeds the turning determination threshold and when a turn of vehicle 100 is predicted.

Switching unit 1009A outputs the latest value of distance DA to estimated point EP when the output of comparison unit 1011A is "1" and when a turn of vehicle 100 is not predicted.

In contrast, switching unit 1009A outputs the previous output value of subtraction unit 1008A when the output of comparison unit 1011A is "0" and when a turn of vehicle 100 is predicted.

That is, when a turn of vehicle 100 is predicted based on the comparison between the estimated lateral acceleration and the turning determination threshold, switching unit 1009A and comparison unit 1011A define the point at which the estimated lateral acceleration used in the prediction determination has been calculated as the turning start point, and subtract distance DA from vehicle 100 to the turning start point as vehicle 100 runs.

In contrast, switching unit 1010A outputs either the output of switching unit 1009A or the latest value of distance DA to estimated point EP, based on the output of an AND unit 1012A.

AND unit 1012A outputs "1" when the output of a comparison unit 1013A is "1" and when the output of a comparison unit 1014A is "1".

Switching unit 1010A outputs the latest value of distance DA to estimated point EP when the output of AND unit 1012A is "1".

Comparison unit 1013A outputs "1" when the steering angle is equal to or greater than a turning determination value.

When the latest output value of comparison unit 1013A differs from the previous output value of comparison unit 1013A, that is, when the determination of whether the steering angle is equal to or greater than the turning determination value is the opposite, comparison unit 1014A outputs "1".

Thus, AND unit 1012A outputs "1" when the steering angle is switched from a state in which the steering angle is less than the turning determination value to a state in which the steering angle is equal to or greater than the turning determination value. In this case, switching unit 1010A outputs the latest value of distance DA to estimated point EP.

That is, distance DA is reset when the steering angle is switched from a state in which the steering angle is less than the turning determination value to a state in which the steering angle is equal to or greater than the turning determination value, in other words, when vehicle 100 starts to turn.

Timer 1006A, which measures the duration time of the straight-running state of vehicle 100, is reset when the output of comparison unit 1013A is "1" and when the steering angle is equal to or greater than the turning determination value.

Next, a process for the estimated lateral acceleration acquired by table 1003A will be described.

A switching unit 1015A outputs either the information about the estimated lateral acceleration or the output of a switching unit 1016A, based on the output of AND unit 1012A.

Switching unit 1016A outputs either the output of a selection unit 1018A or the previous output value of switching unit 1016A, based on the output of a comparison unit 1017A.

Comparison unit 1017A outputs "1" when the estimated lateral acceleration is equal to or greater than the turning determination value.

Selection unit 1018A selects and outputs the greater of the estimated lateral acceleration and the previous output value of switching unit 1016A.

As described above, AND unit 1012A outputs "1" when the steering angle is switched from a state in which the steering angle is less than the turning determination value to a state in which the steering angle is equal to or greater than the turning determination value.

When AND unit 1012A outputs "1", switching unit 1015A outputs information about the latest estimated lateral acceleration to table 1003A.

In contrast, when AND unit 1012A outputs "0", switching unit 1015A outputs the output of switching unit 1016A to table 1003.

With target roll moment calculation unit 540A having the above-described configuration, AND unit 1012A outputs "0", for example, when vehicle 100 is running on a straight road, when there is no curve ahead, and when the output of comparison unit 1017A is "0".

Thus, switching unit 1016A outputs its previous output value, and switching unit 1015A outputs the output of switching unit 1016A to table 1003.

From this state, when there is a curve ahead of vehicle 100, the estimated lateral acceleration increases, and the output of comparison unit 1017A is switched to "1", switching unit 1016A outputs the increased latest estimated lateral acceleration.

Switching unit 1015A outputs the output of switching unit 1016A to table 1003A until the steering angle is switched from the state in which the steering angle is less than the turning determination value to the state in which the steering angle is equal to or greater than the turning determination value, that is, until vehicle 100 starts a turn.

Thus, after the estimated lateral acceleration reaches the turning determination threshold, until vehicle 100 actually starts to turn, the information about the estimated lateral acceleration output to table 1003A increases as the estimated lateral acceleration increases. After the estimated lateral acceleration starts to decrease, the maximum value so far of the estimated lateral acceleration is output to table 1003A.

"Detailed Functions of Target Pitch Moment Calculation Unit 540B"

Figure 14:
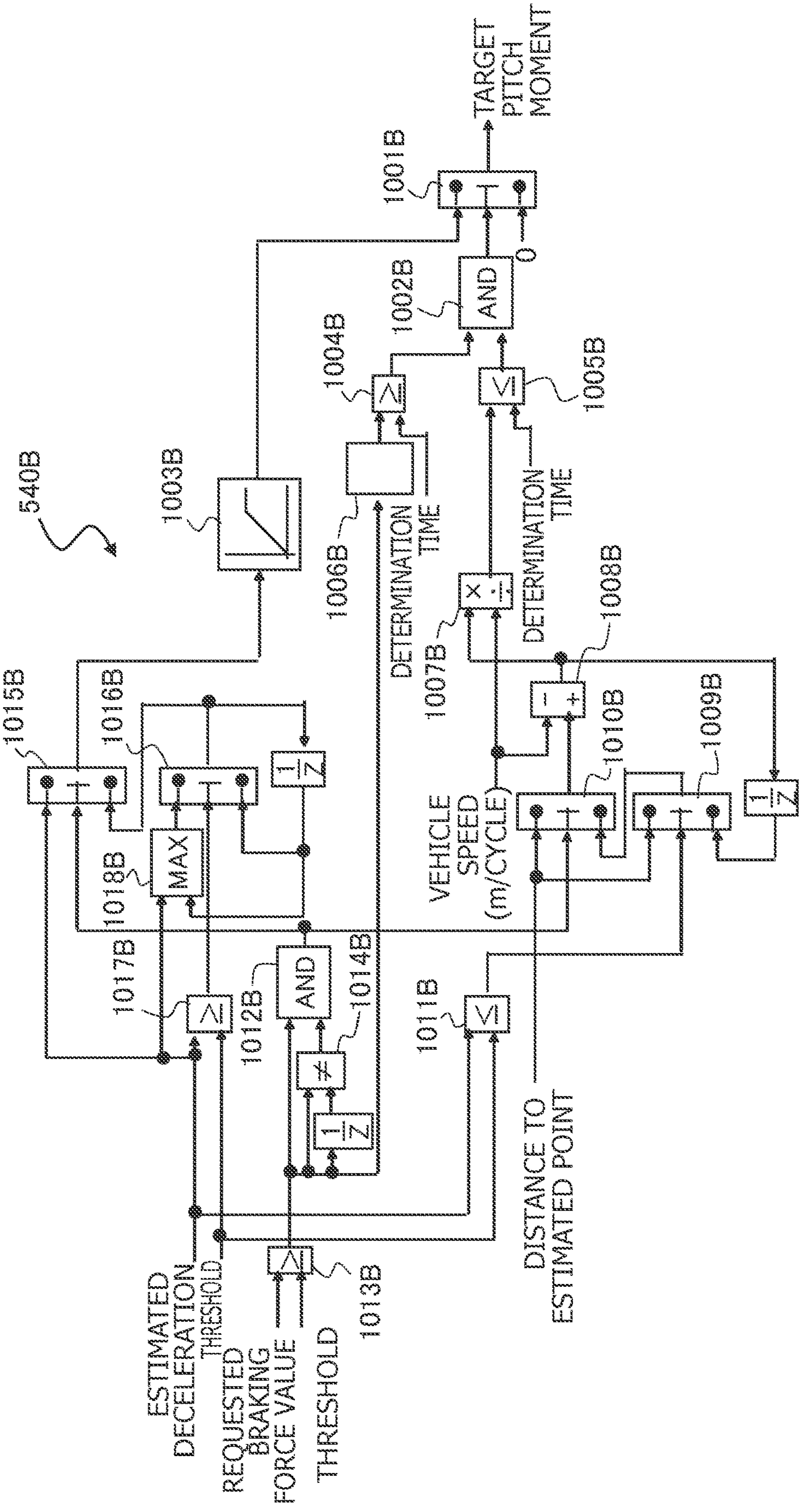
FIG. 14 is a block diagram illustrating details of a target pitch moment calculation unit.

FIG. 14 is a block diagram illustrating details of a target pitch moment calculation unit 540B included in target moment calculation unit 540.

Target pitch moment calculation unit 540B is a functional unit that calculates a target pitch moment for generating a pitch behavior.

Target pitch moment calculation unit 540B includes functional units equivalent to those of target roll moment calculation unit 540A and calculates a target pitch moment.

Thus, the functional units of target pitch moment calculation unit 540B that are equivalent to those of target roll moment calculation unit 540A will be denoted by the same reference numerals. However, the reference numerals in FIG. 14 have a B instead of an A as used in the reference numerals in FIG. 13.

The following description will be made on the difference between target pitch moment calculation unit 540B and target roll moment calculation unit 540A.

Target pitch moment calculation unit 540B differs from target roll moment calculation unit 540A in input signals of comparison units 1017A and 1017B and input signals of comparison units 1013A and 1013B.

Comparison unit 1017B of target pitch moment calculation unit 540B executes deceleration prediction determination by comparing the estimated deceleration with a deceleration determination threshold.

In addition, comparison unit 1013B of target pitch moment calculation unit 540B determines the start of deceleration by comparing a requested braking force value with a deceleration determination threshold.

Table 1003B calculates a target pitch moment based on the estimated deceleration, and switching unit 1001B outputs the target pitch moment that generates a pitch behavior for notifying the occupant in advance of the deceleration of vehicle 100.

"Emergency Avoidance Action and Vehicle Behavior Generation Control"

The following description will explain execution of vehicle behavior generation control when vehicle 100 executes an emergency avoidance action.

Figure 15:
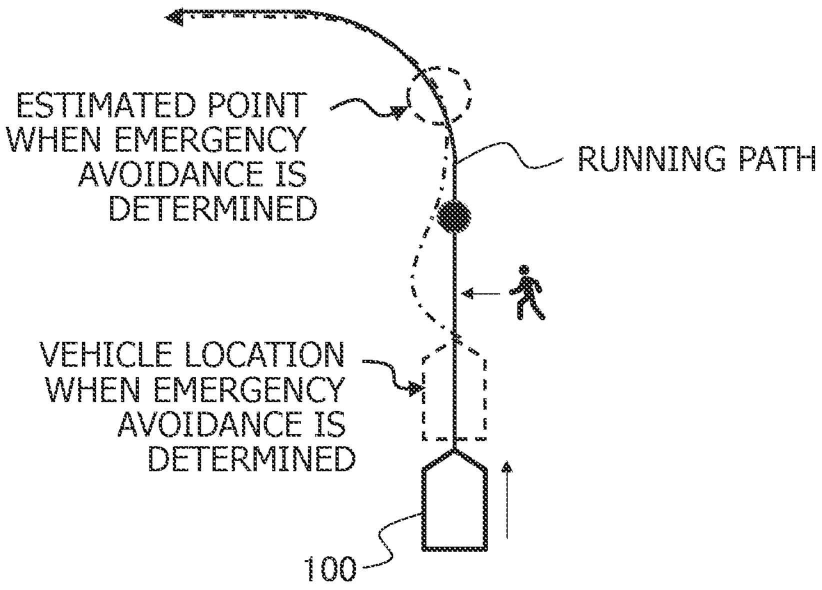
FIG. 15 illustrates a running path on which the vehicle executes an emergency avoidance action.

FIG. 15 illustrates a situation in which based on prediction of a turn, microcomputer 510 generates a roll behavior before the turn and in which an unexpected obstacle, a pedestrian, or the like suddenly appears on the running path of vehicle 100 between vehicle 100 and the estimated point.

In this situation, vehicle 100 executes an emergency avoidance action. For example, automated driving is canceled, and the driver performs an emergency avoidance operation. Alternatively, a drive assist function achieving emergency avoidance is executed, and emergency avoidance steering or emergency avoidance braking is executed.

As described above, when vehicle 100 executes an emergency avoidance action, microcomputer 510 cancels the vehicle behavior generation control, and stops generating the roll behavior for notifying the occupant of the turn.

In this situation, based on information about execution or non-execution of the emergency avoidance action of vehicle 100 such as an emergency avoidance determination flag, which is a trigger for canceling automated driving or a trigger for executing drive assist for emergency avoidance, microcomputer 510 determines that vehicle 100 needs to execute an emergency avoidance action, and cancels the vehicle behavior generation control.

Specifically, control execution determination unit 530 illustrated in FIGS. 1 and 12 determines that vehicle 100 needs to execute an emergency avoidance action and outputs a cancel command to target moment calculation unit 540. As a result, the target moment (specifically, the target roll moment or the target pitch moment) output by target moment calculation unit 540 is set to "0".

When microcomputer 510 determines that vehicle 100 needs to execute an emergency avoidance action, microcomputer 510 resets the values of, for example, the distance and the time to estimated point EP. After the emergency avoidance action ends and a normal running operation is restored, microcomputer 510 determines whether to execute the vehicle behavior generation control based on the estimated lateral acceleration or the estimated deceleration at that point in time.

Figure 16:
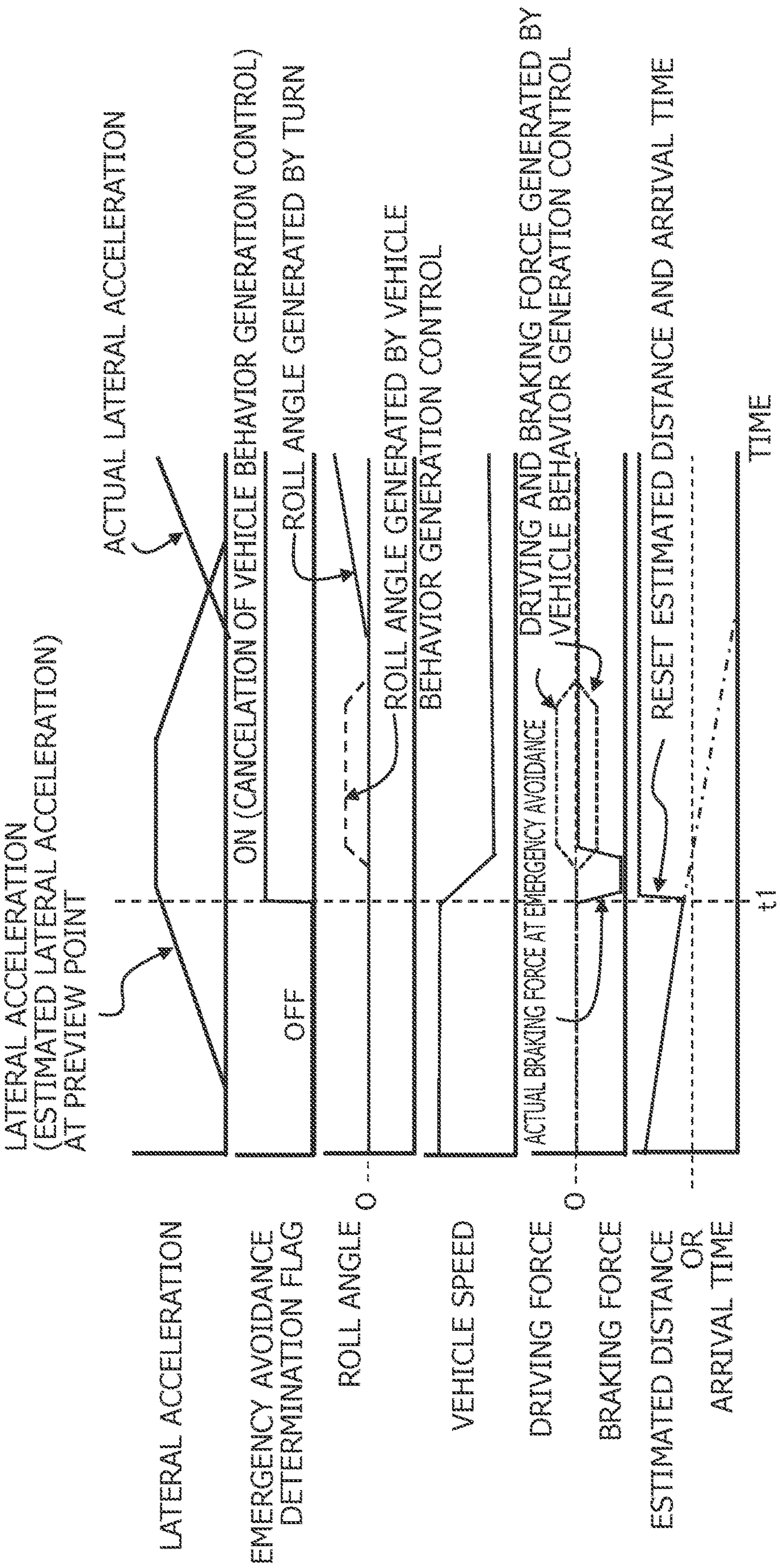
FIG. 16 is a time chart illustrating change in lateral acceleration, roll angle, driving force, braking force, etc., when the vehicle executes the emergency avoidance action.

FIG. 16 is a time chart illustrating the state of the vehicle behavior generation control when vehicle 100 executes an emergency avoidance action.

At time t1 at which the estimated lateral acceleration has increased and a turn has been predicted, surrounding area information recognition unit 300 detects a sudden appearance of an obstacle, a pedestrian, or the like, and an emergency avoidance determination flag is set to on. As a result, microcomputer 510 cancels the vehicle behavior generation control, that is, cancels the control of the driving force and the braking force for generating a target roll moment (or a target pitch moment), and generates braking force for emergency avoidance.

In addition, when the emergency avoidance determination flag is set to on at time t1, microcomputer 510 resets the values of, for example, the distance and the time to estimated point EP.

"Vehicle Behavior Generation Control on Running Path Having Consecutive Curves"

Description will now be given for vehicle behavior generation control executed on a running path having consecutive curves.

Figure 17:
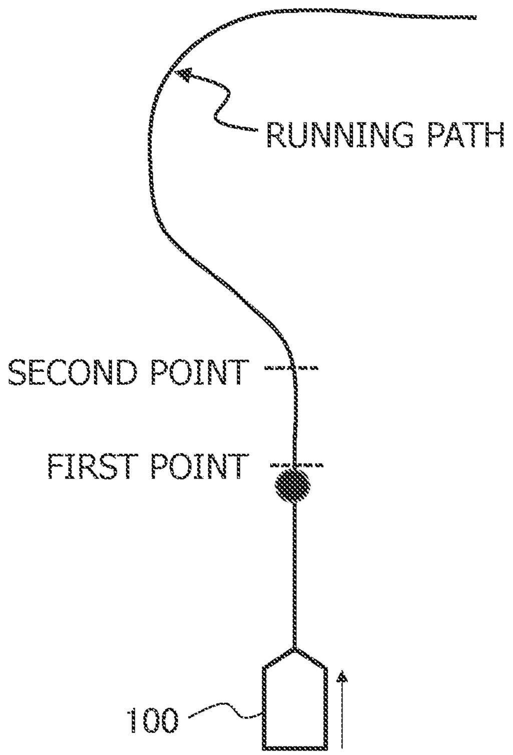
FIG. 17 illustrates a running path on which a right curve and a left curve appear consecutively.

FIG. 17 illustrates a running path of vehicle 100 on which a left curve and a right curve appear continuously from a second point ahead of vehicle 100.

Figure 18:
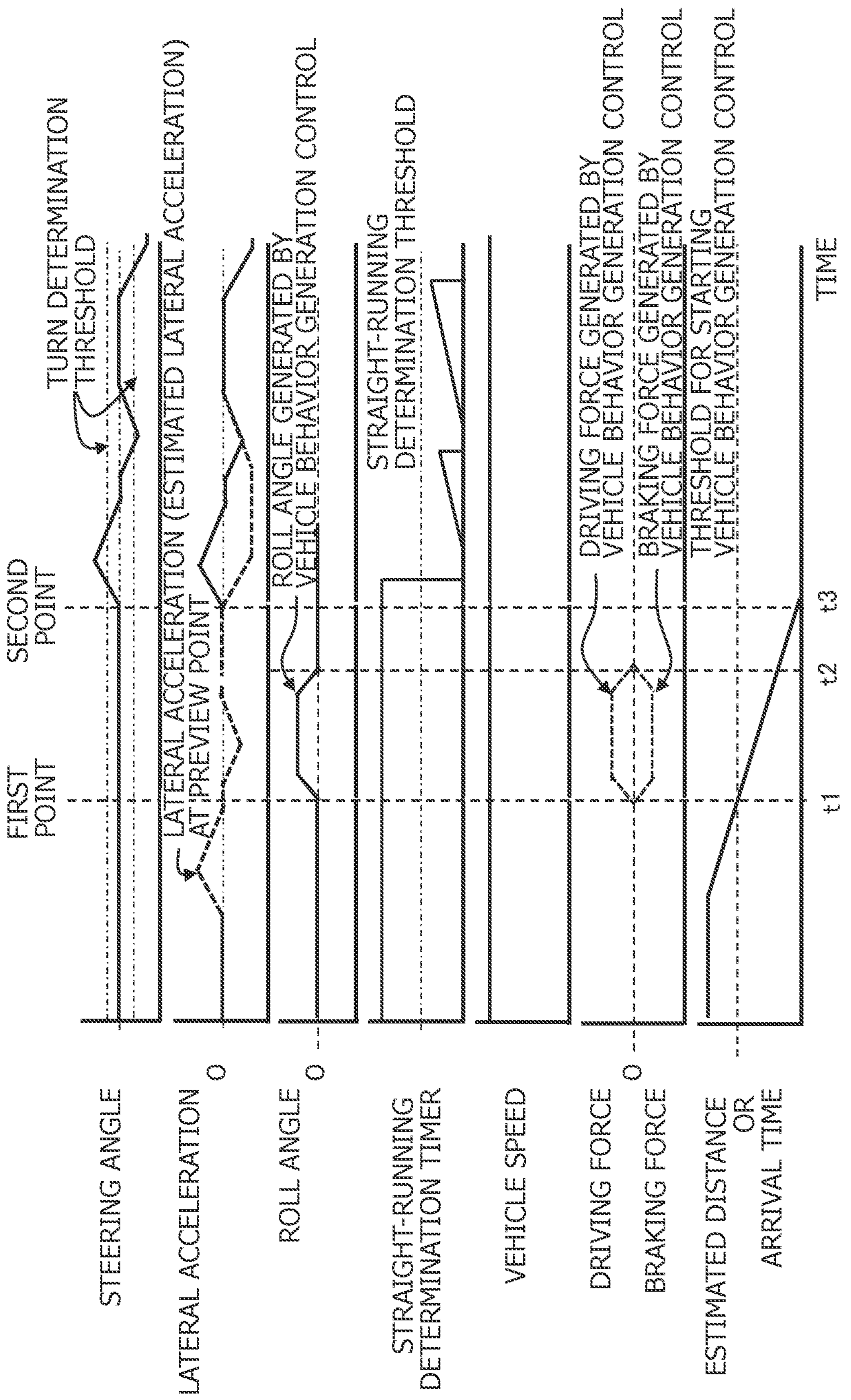
FIG. 18 is a time chart illustrating change in steering angle, lateral acceleration, roll angle, driving force, braking force, etc., on the running path on which the right curve and the left curve appear consecutively.

FIG. 18 is a time chart illustrating change in steering angle, lateral acceleration, roll angle, value of the straight-running determination timer (timer 1006A in FIG. 13), speed, driving and braking force, etc., when vehicle 100 runs on the running path illustrated in FIG. 17.

As described above, the straight-running determination timer is reset when the steering angle is equal to or greater than a threshold. A condition for vehicle control apparatus 500 (target moment calculation unit 540) to generate a vehicle behavior is that the straight-running determination timer indicates a value over a threshold, that is, vehicle 100 has been running straight for a predetermined time or more.

When vehicle 100 runs on the running path illustrated in FIG. 17, vehicle control apparatus 500 starts the control for generating a roll behavior for notifying the occupant in advance of the start of a turn at a first point (time t1 in FIG. 18) before a second point, which is the start point of a curve.

Thereafter, vehicle control apparatus 500 stops generating a roll behavior for notifying the occupant in advance of the start of the turn at a point (time t2 in FIG. 18), which is before vehicle 100 reaches the second point, which is the start point of the curve.

In this situation in which curves appear consecutively after the second point, the lateral acceleration reaches "0" between the curves. That is, the lateral acceleration in this section is the same as that in a straight section.

However, vehicle control apparatus 500 including target roll moment calculation unit 540A illustrated in FIG. 13 determines that the roll behavior generation control execution condition is met when the value of the straight-running determination timer (timer 1006A in FIG. 13) reaches a certain value.

Thus, even if the lateral acceleration is temporarily represented by "0" between the curves (or even if the steering angle is represented by "0" corresponding to its neutral position), because the vehicle has been running straight for only a short time, vehicle control apparatus 500 does not determine that the roll behavior generation control execution condition is met, that is, does not execute the roll behavior generation control for notifying the occupant of the start of a turn.

That is, although vehicle control apparatus 500 generates a roll behavior for notifying the occupant in advance of the start of a turn before the second point, which is the start point of a curve, vehicle control apparatus 500 does not generate a roll behavior for notifying the occupant of the start of a turn in a situation in which curves consecutively appear after the second point.

"Control Executed when Turning Notification and Deceleration Notification are Made Consecutively or Simultaneously"

Description will be given on the vehicle behavior generation control executed when a turning notification and a deceleration notification are made consecutively or simultaneously.

Figure 19:
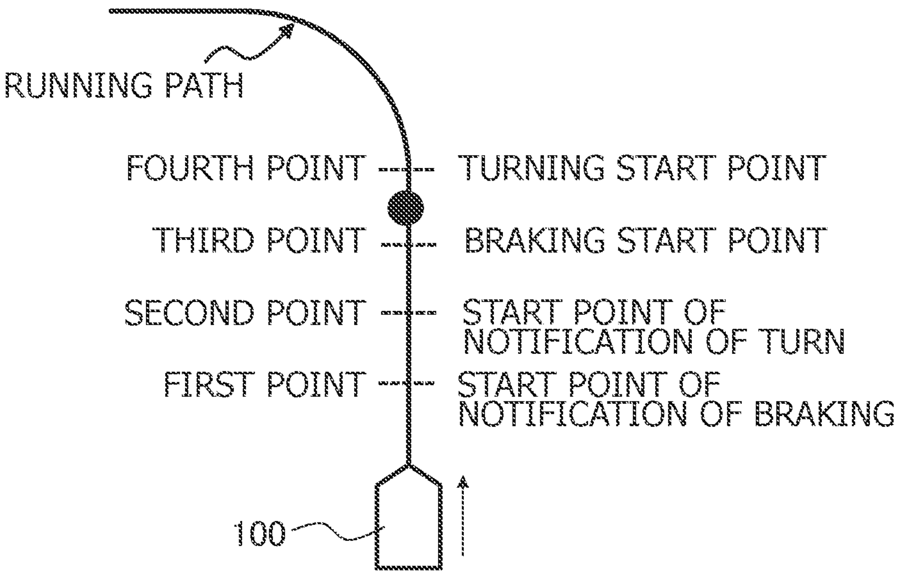
FIG. 19 illustrates a running pattern on which the vehicle decelerates before a curve.

FIG. 19 illustrates a running pattern in which vehicle 100 decelerates before a curve in preparation for running on the curve.

Specifically, vehicle 100 starts to decelerate at a third point, and starts to turn at a fourth point after the third point.

A first point to the fourth point are points that vehicle 100 sequentially traces on the running path in the order of the first to fourth points.

Figure 20:
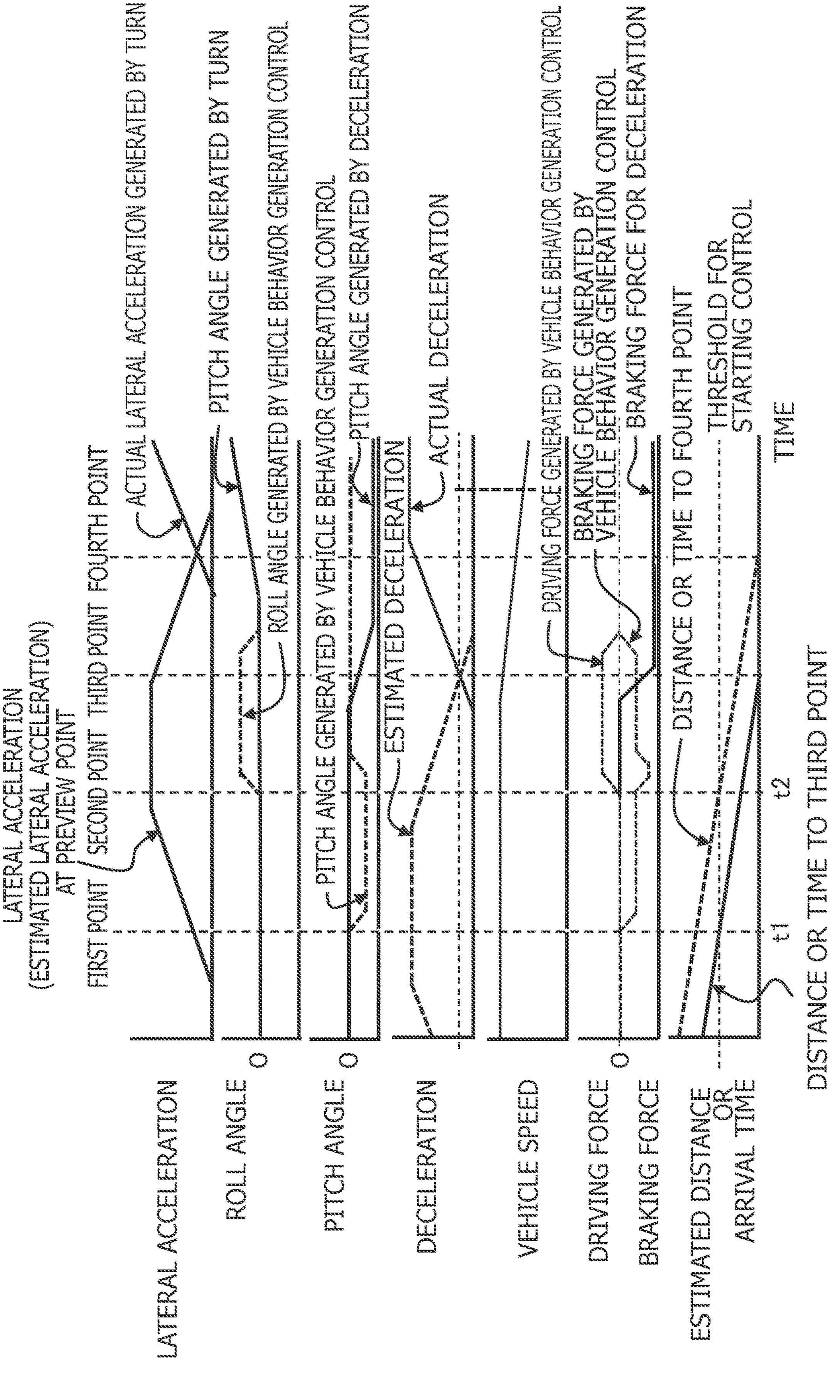
FIG. 20 is a time chart illustrating change in lateral acceleration, roll angle, pitch angle, deceleration, driving force, braking force, etc., when the vehicle decelerates before the curve.

FIG. 20 is a time chart illustrating change in lateral acceleration, roll angle, pitch angle, deceleration, etc., when vehicle 100 runs in the running pattern illustrated in FIG. 19.

In the case of the running pattern illustrated in FIG. 19 in which vehicle 100 starts to decelerate at the third point and starts to turn at the fourth point after the third point, vehicle control apparatus 500 generates a pitch behavior for notifying the occupant of the start of deceleration at the first point (time t1 in FIG. 20), and generates a roll behavior for notifying the occupant of the start of a turn at the second point (time t2 in FIG. 20) after the first point.

That is, in the order of occurrence of the motion states such as a turn and a deceleration, vehicle control apparatus 500 generates vehicle behaviors for notifying the occupant in advance of each of the motion states.

Thus, in the case of a running pattern in which a turn is executed before deceleration, vehicle control apparatus 500 first generates a roll behavior for notifying the occupant of the start of the turn, and next generates a pitch behavior for notifying the occupant of the start of the deceleration.

In addition, in the case of a running pattern in which a turn and deceleration are executed approximately simultaneously, vehicle control apparatus 500 generates a roll behavior for notifying the occupant of the start of the turn and generates a pitch behavior for notifying the occupant of the start of the deceleration approximately simultaneously.

The individual technical concepts described in the above-described example can be appropriately combined and used, as long as there is no conflict.

In addition, although the present invention has thus been described in detail with reference to preferred examples, it will be apparent to those skilled in the art that various types of modifications are possible based on the basic technical concepts and teachings of the present invention.

For example, when vehicle control apparatus 500 generates a roll behavior for notifying the occupant of the start of a turn, vehicle control apparatus 500 may generate the roll behavior in the direction opposite to the direction of the roll angle generated by the turn. In addition, when vehicle control apparatus 500 generates a pitch behavior for notifying the occupant of the start of deceleration, vehicle control apparatus 500 may generate the pitch behavior in the direction opposite to the direction of the pitch angle generated by the deceleration.

In this case, it is possible to reduce the roll behavior generated by the turn and the pitch behavior generated by the deceleration.

In addition, as illustrated in FIG. 19, when vehicle 100 first decelerates before the curve and next enters the curve, vehicle control apparatus 500 may start the generation of the roll behavior for notifying the occupant of the start of the turn in synchronization with the start of the generation of the pitch behavior for notifying the occupant of the start of the deceleration.

In this case, the occupant in vehicle 100 can recognize in advance that vehicle 100 decelerates in preparation for running on a curve.

In a running pattern in which a turn and deceleration are executed approximately simultaneously, vehicle control apparatus 500 may generate either a roll behavior or a pitch behavior.

In this case, vehicle control apparatus 500 may determine whether to notify the occupant in advance of the turn or deceleration, in other words, may determine whether to generate a roll behavior or a pitch behavior, from information about the estimated deceleration, the estimated lateral acceleration, etc.

REFERENCE SYMBOL LIST

100 vehicle
200 vehicle control system
300 surrounding area information recognition unit
400 vehicle motion state acquisition unit
500 vehicle control apparatus
510 microcomputer (control unit)
600 actuator unit

The invention claimed is:

1. A vehicle control apparatus comprising:

a control unit that outputs a result calculated based on input information, wherein the control unit acquires information about an estimated lateral acceleration calculated based on a curvature of a running path on which the vehicle is running and a speed of the vehicle in a preview area ahead on the running path, starts outputting control commands to a driving apparatus and a braking apparatus included in the vehicle for generating a roll behavior based on the estimated lateral acceleration before the vehicle reaches the preview area, and stops outputting the control commands when the vehicle enters the preview area, and wherein the control unit outputs the control commands to the driving apparatus and the braking apparatus such that driving force generated by the driving apparatus and braking force generated by the braking apparatus change more slowly at a start of the output of the control commands than at an end of the output of the control commands.

2. The vehicle control apparatus according to claim 1, wherein a direction of the roll behavior generated based on the control commands is the same as a direction of a roll behavior generated in the vehicle in the preview area.

3. A vehicle control apparatus comprising:

a control unit that outputs a result calculated based on input information, wherein the control unit acquires information about an estimated lateral acceleration calculated based on a curvature of a running path on which the vehicle is running and a speed of the vehicle in a preview area ahead on the running path, starts outputting control commands for generating a roll behavior based on the estimated lateral acceleration before the vehicle reaches the preview area, and stops outputting the control commands when the vehicle enters the preview area, and wherein the control unit outputs the control commands on a condition that a duration time of a straight-running state of the vehicle determined based on a steering angle of the vehicle exceeds a threshold.

4. The vehicle control apparatus according to claim 3, wherein a direction of the roll behavior generated based on the control commands is the same as a direction of a roll behavior generated in the vehicle in the preview area.

5. A vehicle control method comprising:

acquiring, by a control unit mounted in a vehicle, information about an estimated lateral acceleration calculated based on a curvature of a running path on which the vehicle is running and a speed in a preview area ahead on the running path;

starting, by the control unit, outputting control commands for generating a roll behavior based on the estimated lateral acceleration before the vehicle reaches the preview area; and stopping, by the control unit, outputting the control commands when the vehicle enters the preview area; and outputting, by the control unit, the control commands on a condition that a duration time of a straight-running state of the vehicle determined based on a steering angle of the vehicle exceeds a threshold.

* * * * *